US009128512B2

(12) United States Patent
Naono

(10) Patent No.: US 9,128,512 B2
(45) Date of Patent: Sep. 8, 2015

(54) IMAGE DATA PROCESSING SERVER

(71) Applicant: Ripplex Inc., Shibuya-ku, Tokyo (JP)

(72) Inventor: Norihiko Naono, Tokyo (JP)

(73) Assignee: RIPPLEX INC., Tokyo (JP)

( * ) Notice: Subject to any disclaimer, the term of this patent is extended or adjusted under 35 U.S.C. 154(b) by 338 days.

(21) Appl. No.: 13/788,256

(22) Filed: Mar. 7, 2013

(65) Prior Publication Data

US 2013/0182131 A1     Jul. 18, 2013

Related U.S. Application Data

(63) Continuation of application No. PCT/JP2010/065440, filed on Sep. 8, 2010.

(51) Int. Cl.
| | |
|---|---|
| *G06F 3/00* | (2006.01) |
| *G06F 21/62* | (2013.01) |
| *H04N 1/21* | (2006.01) |
| *H04N 5/76* | (2006.01) |
| *G06F 17/30* | (2006.01) |
| *H04N 9/804* | (2006.01) |

(Continued)

(52) U.S. Cl.
CPC .......... *G06F 3/005* (2013.01); *G06F 17/30265* (2013.01); *G06F 21/6254* (2013.01); *H04N 1/2166* (2013.01); *H04N 5/76* (2013.01); *G06F 17/30244* (2013.01); *H04N 9/8042* (2013.01)

(58) Field of Classification Search
CPC ................ G06F 21/6254; G06F 17/30; G06F 17/30244; G06F 17/30997; G06F 7/00; H04N 1/2166

See application file for complete search history.

(56) References Cited

U.S. PATENT DOCUMENTS

2005/0160067 A1 *  7/2005  Sohma et al. .................. 707/1
2005/0238255 A1   10/2005  Niwa et al.

(Continued)

FOREIGN PATENT DOCUMENTS

| CN | 1666712 A | 9/2005 |
|---|---|---|
| CN | 1719862 A | 1/2006 |

(Continued)

OTHER PUBLICATIONS

Office Action issued by JPO dated Aug. 19, 2014 of corresponding Japanese application No. 2011-005162.

(Continued)

*Primary Examiner* — Jerry Dennison
*Assistant Examiner* — Albert Chiou
(74) *Attorney, Agent, or Firm* — Lowe Hauptman & Ham, LLP

(57) ABSTRACT

Provided is a server, wherein an image group and a terminal ID are received from an imaging terminal, a first ID specifying a first image among the image group, the terminal ID, and the first image are stored in a first storage, a second ID specifying a second image among the image group, the terminal ID, and the second image are stored in a first storage, a user ID and a terminal ID are received from an data terminal, the user ID and the terminal ID are stored in a second storage, the terminal ID is extracted by conducting a search thereof inside the second memory using the user ID as the key, the first image and the second image are extracted as a result of conducting a search thereof inside the first storage using the terminal ID as the key, a first summary image is stored in association with the terminal ID and the first ID in a third storage, a second summarized image is stored in association with the terminal ID and the second ID in the third storage, and the first summary image and the second summary image are sent to the data terminal.

15 Claims, 27 Drawing Sheets

(56) References Cited

U.S. PATENT DOCUMENTS

2006/0007481 A1 1/2006 Kato et al.
2011/0128389 A1 6/2011 Maeda et al.

FOREIGN PATENT DOCUMENTS

| | | |
|---|---|---|
| JP | 2003-345701 A | 12/2003 |
| JP | 2004-248327 A | 9/2004 |
| JP | 2004-304309 A | 10/2004 |
| JP | 2005-190155 A | 7/2005 |
| WO | 2008/023747 A | 2/2008 |

OTHER PUBLICATIONS

Written Opinion of the International Search Authority of PCT/JP2010/65440 issued Oct. 5, 2010.

Office Action dated May 20, 2015 regarding a corresponding Chinese Patent Application No. 201080069038.4.

* cited by examiner

| user ID | password | CID | HID |
|---|---|---|---|
| .... | .... | .... | .... |
| hoge@example.com | 12345 | N12345678 | ST12S512 |
| .... | .... | | |

(Second Embodiment: Display in display terminal A)

Fig. 27

| Web service name | Authentication URL | URL for obtaining acquaintance list | URL for sending a message |
|---|---|---|---|
| V | https://ServiceV/auth | http://ServiceV/friend/ | http://ServiceV/msg |
| S | https://ServiceS/signin | http://ServiceS/list/ | http://ServiceS/send |

Fig. 30

| user ID | Password | display name | acquaintance ID |
|---|---|---|---|
| ... | ... | ... | ... |
| hoge@svcV.com | 12345 | John | foo@svcV.com, bar@svcV.com |
| foo@svcV.com | 6542 | Betty | hoge@svcV.com |
| bar@svcV.com | mountain5 | Fred | hoge@svcV.com |
| ... | ... | ... | ... |

IMAGE DATA PROCESSING SERVER

CROSS-REFERENCE TO RELATED APPLICATION

This application is a U.S. continuation application filed under 35 USC 111(a) claiming benefit under 35 USC 120 and 365(c) of PCT application JP2010/065440, filed on Sep. 8, 2010, the entire contents of which are incorporated herein by reference.

BACKGROUND OF THE INVENTION

1. Field of the Invention

The present invention is related to a method for providing a function for managing, storing, printing, and sending image data by cooperation of an imaging terminal, a data terminal, a connected display, and server, and an imaging terminal, data terminal, display terminal, and server.

2. Description of the Related Art

With the spread of digital cameras, the number of images taken by a single user has increased dramatically compared to the period when silver halide film type cameras were prevailing. This is largely due to the low cost per image taken. Furthermore, in recent years the storage capacity of storage devices such as a flash memory used in a digital camera has increased significantly with the miniaturization of semiconductor technology leading to an increase in the number of photographed images. A camera user can photograph a large amount of images without concern for cost or storage capacity limitations and by adjusting images after they are taken can select and keep only those deemed good.

In addition, in recent years, imaging elements have been increasingly installed in mobile type data terminals other than cameras such as mobile personal computers, mobile phones, mobile music players, and the like. This has made imaging possible using mobile data terminals. Many of these data terminals can connect to the internet and not only are photographed images stored in a storage means within the terminal but can also be sent to a server via the internet and used in various Web services.

Recently, many mobile phones include an imaging function. Although many people do not usually carry cameras, since most people usually carry mobile phones, more images are being taken compared to the period which relied exclusively on camera dedicated devices for taking photographs. Since many mobile phones include a function for connecting to the internet, many of the images taken using a mobile phone are utilized in various services on the internet.

SUMMARY OF THE INVENTION

In this way, the spread of digital cameras, the large increase in capacity of storage devices, the installation of imaging devices in various mobile terminals and connecting these devices and terminal to the internet has led to a dramatic increase in the number of images taken by a single user. As stated above, this has provided various benefits to users. On the other hand, in order for a user to take a large number of images using a plurality of imaging terminals it is difficult to manage and maintain the images taken leading to new problems. There are seven problems. which are facing photographers, which need to be addressed relating to managing and maintaining a large number of images.

First, there is a problem whereby copying to a data terminal which manages and maintains image data from an imaging device is troublesome. Generally, image data taken by a camera or a data terminal is stored in a detachable storage media. SD memory cards or compact flash (registered trademark) cards are mainly used as storage media. After a user takes an image, these storage media are removed from the imaging terminal, a connection is made to the data terminal for managing and maintaining images and the image is copied to the data terminal. A personal computer is often used as such a data terminal for managing and maintaining images. For general users, copying a large amount of image data to a personal computer from a storage media is troublesome.

Second, there is a problem whereby it is difficult for a user to consolidate the locations of each image in order to use a plurality of imaging terminals such as a camera or mobile phone, image data held by a user who owns a plurality of imaging terminals is separated into storage media attached to each imaging terminal and stored. In order to consolidate the image data it is necessary to sequentially copy the image data from each storage media to a personal computer for managing and maintaining the image data. Not only is this process troublesome but in the case where the format of image data is different in each data terminal, it is necessary to convert the format of the image data before managing all the images in a personal computer. This process becomes more difficult when there is a large amount of image data.

Third, since there are many methods for using image data it is necessary for a user to copy image data or convert the format of each image for each usage method. For example, in the case where data taken with a camera is uploaded to a server of an SNS (Social Networking Service), a user must carry out a number of complex operations such as first copying image data from a storage media in the camera to a personal computer, adjusting the resolution or convert the format of the images on the personal computer before uploading the SNS server. In addition, in the case of printing image data, a user copies image data from the storage media of a camera to a personal computer, further copies the image data to a disk before taking the disk to a print service provider. In order to use an image browsing device such as a digital photo frame which have become widespread in recent years, after copying image data to another storage media via a personal computer it is necessary to connect the storage media to the image browsing device. In particular, it becomes even more troublesome when using images taken with a plurality of imaging terminals for various different purposes and there are not many users who have already managed all of their image data.

Fourth, backing up image data is difficult. In addition to a user taking a large amount of images using a plurality of imaging terminals, the storage capacity per image is increasing along with improvements in the capabilities of recent imaging devices. The total volume of image data taken by a single user has increased significantly due to these synergetic effects. The total volume of all images is often more than a storage device of a personal computer let alone a memory card or a storage disk. As a result, it becomes more difficult to perform a backup so that image data is not lost. In the case where the volume of image data to be backed up exceeds the capacity of usual storage media, a Large capacity external storage device such as an HDD (Hard Disk Drive) is used as a backup means. Alternatively, it is possible to use a backup service on a server which can be connected to the internet. However, these not only incur costs but also time to transfer such a large amount of data.

The first to third problem and the fourth problem have a two sided relationship. Because it is difficult to organize a large amount images, a large capacity storage means is required for maintaining most image data that cannot be organized. In addition, because all of this image data is stored in a large capacity storage means, it becomes even more difficult to organize the image data and the image data which cannot be organized further increases. For many users this is a vicious circle.

Attempts have been made to solve these problems using the internet. There are already many mobile phones and personal computers that can be connected to the internet. In addition, proposals have made to directly connect cameras, mobile music players or storage media used in cameras to the internet (JP4,251,757B, JP3,664,203B, JP2003-283900A). In addition, proposals have also been disclosed to either select or set whether image data is stored to a memory card of an imaging terminal or directly uploaded to the internet (JP2010-178360A). However, attempts to utilize the internet such as these produce further problems such as the fifth, six and seventh problems described below. As a result, management and maintenance of image data utilizing the internet is not widely used and therefore does not lead to solving the first to fourth problems described above.

Fifth, costs are incurred when consolidating a large amount of image data taken with a plurality of imaging terminals in a storage device of a Web server. Although many services which store image data in a server on the internet provide such services with free of charge, such services have an upper limit storage capacity and charge a fee for storage of data which exceeds this capacity. This upper limit storage capacity is below the storage capacity required by most users for unified storage of all their data. Many users do not like to pay such costs and therefore do not use these services. As a result, the first to the fourth problems are not solved.

Sixth, maintaining privacy and impossibility of improving convenience are problems. When a user manages image data in a unified storage device in a Web server, at least the provider of the Web service can specify the image data taken by each user. Furthermore, because it is assumed that most recent photograph storage services mainly publish image data on the internet or provide browsing by internet acquaintances, data related to image data held by a user may be disclosed on the internet. In addition, by correlating in advance data which can uniquely specify an imaging device or data which can uniquely specify a user on the internet with image data taken with a plurality of imaging devices, each image data can specify who and by what device such images were taken. If this is possible, it becomes possible to significantly improve the convenience of a Web service related to the storage of image data. However, while such image data is data which has a possibility of being disclosed on the internet, it is difficult to correlate data related to an imaging device or a user with such image data.

Seventh, there are many Web service on the internet related to storing, sharing, and sending images and thus a situation arises where image data taken by a single user is scattered among various Web services. Generally, a single user uses a number of Web services. For example, a certain user generally uses various image data service such as a service Z on the internet mainly for backing up image data, a print service U on the internet for printing image data, a service V on the internet for exchanging a diary with acquaintances which includes image data and electronic mail for sending image data to acquaintances. In this case, even if all the image data taken by a single user exists in a server on the internet, since this data is scattered on and managed by various services, the difficulty of organizing such data described as the first to the third problems above are not resolved.

The present invention attempts to solve the problems described above by providing a server, an imaging terminal, a data terminal, a display terminal, and a system in which a user can uniformly organize, manage, and maintain image data which are taken by various imaging terminals and which are scattered and stored among various servers and terminals by using a gateway service on the internet. In addition, according to the present invention, because it is possible to separate and store image data among various storage media, it is possible to solve the problem of cost incurred when storing a large amount of image data on a server and to solve the problem of backup without increasing the complexity of organizing, managing and maintaining image data.

One embodiment of the present invention provides a server providing a network service including: receiving from a first imaging terminal of a first user a first image data group comprised from a plurality of image data and a first imaging terminal ID for uniquely specifying the first imaging terminal; storing in a first storage means a first image ID for uniquely specifying a first image data being one image data in the first image data group, the first imaging terminal ID, and the first image data with the first image ID and the first imaging terminal ID correlated with the first image data; storing in the first storage means a second image ID for uniquely specifying a second image data being another image data in the first image data group sent from the first imaging terminal, the first imaging terminal ID, and the second image data with the second image ID and the first imaging terminal ID correlated with the second image data; receiving a first user ID for specifying the first user among users of the network service and the first imaging terminal ID from a first data terminal of the first user; storing in a second storage means the first user ID and the first imaging terminal ID with the first user ID correlated with the first imaging terminal ID; searching in the second storage means using the first user ID as a search key and extracting the first imaging terminal ID as a search result; searching in the first storage means using the extracted first imaging terminal ID as a search key and extracting the first image data and the second image data as a search result; generating a first summary image, which represents the first image data, having a smaller amount of data than the first image data; generating a second summary image, which represents the second image data, having a smaller amount of data than the second image data; storing in a third storage means the first summary image with the first imaging terminal ID and the first image ID correlated with the first summary image; storing in the third storage means the second summary image with the first imaging terminal ID and the second image ID correlated with the third storage means; and sending the first summary image and the second summary image to the first data terminal.

One embodiment of the present invention provides a server providing a network service including: receiving a first image data group comprised from a plurality of image data and a first imaging terminal ID for uniquely specifying a first imaging terminal of a first user from the first imaging terminal of the first user, the first image data group being imaged by the first imaging terminal; storing in a first storage means a first image ID for uniquely specifying a first image data being one image data in the first image data group with the first imaging terminal ID and the first image data correlated with the first image ID; storing in the first storage means a second image ID for uniquely specifying a second image data being another image data in the first image data group with the first imaging terminal ID and the second image data correlated with the second image ID; receiving a first user ID for specifying the first user among users of the network service and the first imaging terminal ID from a first data terminal; searching in a second storage means using the first user ID as a search key and extracting the first imaging terminal ID as a search result; searching in the first storage means using the extracted first imaging terminal ID as a search key and extracting the first image data and the second image data as a search result; generating a first summary image, which represents the extracted first image data, having a smaller amount of data than the first image data; generating a second summary image, which represents the extracted second image data, having a smaller amount of data than the second image data; storing in a third storage means the first summary image with the first imaging terminal ID and the first image ID correlated with the first summary data; storing in the third storage means the second summary image with the first imaging terminal ID and the second image ID correlated with the second summary image; and sending the first summary image and the second summary image to the first data terminal.

One embodiment of the present invention provides a server providing a network service including: receiving from a first imaging terminal of a first user a first image data group comprised from a plurality of image data and a first imaging terminal ID for uniquely specifying the first imaging terminal; sending a first image ID for uniquely specifying a first image data being one image data in the first image data group, a second image ID for uniquely specifying a second image data being another image data, and the first imaging terminal ID to a server of a bridge service; receiving a first scrambled PID and a second scrambled PID from the server of the bridge service; storing in a first storage means the first scrambled PID and the first image data with the first scrambled PID correlated with the first image data; storing in the first storage means the second scrambled PID and the second image data with the second scrambled PID correlated with the second image data; receiving a first user ID for specifying the first user among users of the network service and the first imaging terminal ID from a first data terminal of the first user; storing in a second storage means the first user ID and the first imaging terminal ID with the first user ID correlated with the first imaging terminal ID; searching in the second storage means using the first user ID as a search key and extracting the first imaging terminal ID as a search result; sending the extracted first imaging terminal ID to the server of the bridge service; receiving the first scrambled PID and the second scrambled. PID from the server of the bridge service; searching in the first storage means using the received first scrambled PID as a search key and extracting the first image data as a search result; searching in the first storage means using the received second scrambled PID as a search key and extracting the second image data as a search result; generating a first summary image, which represents the extracted first image data, having a smaller amount of data than the first image data; generating a second summary image, which represents the second image data, having a smaller amount of data than the second image data; storing in a third storage means the first summary image and the first scrambled PID with the first summary image correlated with the first scrambled PID; storing in the third storage means the second summary image and the second scrambled PID with the second summary image correlated with the second scrambled PID; and sending the first summary image and the second summary image to the first data terminal.

One embodiment of the present invention provides a server providing a network service including: receiving from a first imaging terminal of a first user a first image data group comprised from a plurality of image data and a first imaging terminal ID for uniquely specifying the first imaging terminal, the first image data group being imaged by the first imaging terminal; sending a first image ID for uniquely specifying a first image data being one image data in the first image data group, a second image ID for uniquely specifying a second image data being another image data, and the first imaging terminal ID to a server of a bridge service; receiving a first scrambled PID and a second scrambled PID from the server of the bridge service; storing in a first storage means the first scrambled PID and the first image data with the first scrambled PID correlated with the first image data; storing in the first storage means the second scrambled PID and the second image data with the second scrambled PID correlated with the second image data; receiving a first user ID for specifying the first user among users of the network service and the first imaging terminal ID from a first data terminal; storing in a second storage means the first user ID and the first imaging terminal ID with the first user ID correlated with the first imaging terminal ID; searching in the second storage means using the first user ID as a search key and extracting the first imaging terminal ID as a search result; sending the extracted first imaging terminal ID to the server of the bridge service; receiving the first scrambled PID and the second scrambled PID from the server of the bridge service; searching in the first storage means using the received first scrambled PID as a search key and extracting the first image data as a search result; searching in the first storage means using the received second scrambled PID as a search key and extracting the second image data as a search result; generating a first summary image, which represents the extracted first image data, having a smaller amount of data than the first image data; generating a second summary image, which represents the extracted second image data, having a smaller amount of data than the second image data; storing in a third storage means the first summary image and the first scrambled PID with the first summary image correlated with the first scrambled PID; storing in the third storage means the second summary image and the second scrambled PID with the second summary image correlated with the second scrambled PID; and sending the first summary image and the second summary image to the first data terminal.

One embodiment of the present invention provides a system including: a first imaging terminal of a first user, a server of a network service, and a bridge server; wherein: the first imaging terminal of the first user sends a first image data group comprised from a plurality of image data and a first imaging terminal ID for uniquely specifying the first imaging terminal to a server of a network service; the server of the network service sends a first image ID for uniquely specifying a first image data being one image data among the first image data group, a second image ID for uniquely specifying a second image data being another image data, and the first imaging terminal ID to a bridge server; the bridge server generates a first scrambled PID formed by a non-reversible calculation of the first image ID and the first imaging terminal ID; the bridge server generates a second scrambled PID formed by a non-reversible calculation of the second image ID and the first imaging terminal ID; the bridge server stores in a fifth storage means the first imaging terminal ID, the first scrambled PID, and the second scrambled PID with the first imaging terminal ID and the first scrambled RD correlated with the second scrambled PID; the bridge server sends the first scrambled PID and the second scrambled PID to the sever of the network service; the server of the network service stores in a first storage means the first scrambled PID and the first image data with the first scrambled RID correlated with the first image data; the server of the network service stores in the first storage means the second scrambled PID and the second image data with the second scrambled PID correlated with the second image data; a first data terminal of the first user sends a first user ID for specifying the first user among users of the network service and the first imaging terminal ID to the server of the network service; the server of the network service stores in a second storage means the received first user ID and the first imaging terminal ID with the received first user ID correlated with the first imaging terminal ID; the server of the network service searches in the second storage means using the first user ID as a search key and extracting the first imaging terminal ID as a search result; the server of the network service sends the extracted first imaging terminal to the bridge server; the bridge server searches in the fifth storage means using the received first imaging terminal ID as a search key; the bridge server sends the first scrambled PID and the second scrambled PID extracted as a search result to the server of the network service; the server of the network service receives the first scrambled PID and the second scrambled PID; the server of the network service searches in the first storage means using the received first scrambled RID as a search key and extracting the first image data as a search result; the server of the network service searches in the first storage means using the received second scrambled PID as a search key and extracting the second image data as a search result; the server of the network service generates a first summary image, which represents the extracted first image data, having a smaller amount of data than the first image data; the server of the network service generates a second summary image, which represents the extracted second image data, having a smaller amount of data than the second image data; the server of the network service stores in a third storage means the first summary image and the first scrambled PID with the first summary image correlated with the first scrambled PID; the server of the network service stores in the third storage means the second summary image and the second scrambled PID with the second summary image correlated with the second scrambled PID; the server of the network service sends the first summary image and the second summary image to the first data terminal; and a display means of the first data terminal displays the received first summary image and the second summary image.

One embodiment of the present invention provides a system including: a first imaging terminal of a first user, a server of a network service, and a bridge server; wherein: the first imaging terminal of the first user sends a first image data group comprised from a plurality of image data to a first data terminal of the first user; the first data terminal sends the first image data group and a first imaging terminal ID for uniquely specifying the first imaging terminal to a server of a network service; the server of the network service sends a first image ID for uniquely specifying a first image data being one image data among the first image data group, a second image ID for uniquely specifying a second image data being another image data, and the first imaging terminal ID to a bridge server; the bridge server generates a first scrambled PID formed by a non-reversible calculation of the first image ID and the first imaging terminal ID; the bridge server generates a second scrambled PID formed by a non-reversible calculation of the second image ID and the first imaging terminal ID; the bridge server stores in a fifth storage means the first imaging terminal ID, the first scrambled PID, and the second scrambled PID with the first imaging terminal ID and the first scrambled PID correlated with the second scrambled PID; the bridge server sends the first scrambled PID and the second scrambled PID to the server of the network service; the server of the network service stores in a first storage means the first scrambled PID and the first image data with the first scrambled PID correlated with the first image data; the server of the network service stores in the first storage means the second scrambled PID and the second image data with the second scrambled PID correlated with the second image data; the first data terminal of the first user sends a first user ID for specifying the first user among users of the network service and the first imaging terminal ID to the server of the network service; the server of the network service stores in a second storage means the received first user ID and the first imaging terminal ID with the received first user ID correlated with the first imaging terminal ID; the server of the network service searches in the second storage means using the first user ID as a search key and extracting the first imaging terminal ID as a search result; the server of the network service sends the extracted first imaging terminal to the bridge server; the bridge server searches in the fifth storage means using the received first imaging terminal ID as a search key; the bridge server sends the first scrambled PID and the second scrambled PID extracted as search results to the server of the network service; the server of the network service receives the first scrambled PID and the second scrambled PID from the bridge server; the server of the network service searches in the first storage means using the received first scrambled PID as a search key and extracting the first image data as a search result; the server of the network service searches in the first storage means using the received second scrambled PID as a search key and extracting the second image data as a search result; the server of the network service generates a first summary image, which represents the extracted first image, having a smaller amount of data than the first image data; the server of the network service generates a second summary image, which represents the extracted second image data, having a smaller amount of data than the second image data; the server of the network service stores in a third storage means the first summary image and the first scrambled PID with the first summary image correlated with the first scrambled PID; the server of the network service stores in the third storage means the second summary image and the second scrambled PID with the second summary image correlated with the second scrambled PID; the server of the network service sends the first summary image and the second summary image to the first data terminal; and a display means of the first data terminal displays the received first summary image and the second summary image.

BRIEF EXPLANATION OF THE DRAWINGS

FIG. 27 is an exemplary diagram of a Web service table in a server Y related to one embodiment of the present invention, FIG. 30 is an exemplary diagram of a user table in a server V related to one embodiment of the present invention.

DETAILED DESCRIPTION OF THE INVENTION

Embodiments currently considered as a best for realizing the invention are explained below. Because the scope of the present invention is clearly defined by the scope of the attached claims, the explanation should not be interpreted as narrowing the present invention and is merely intended to exemplify the general principles of the invention.

Figure 1:
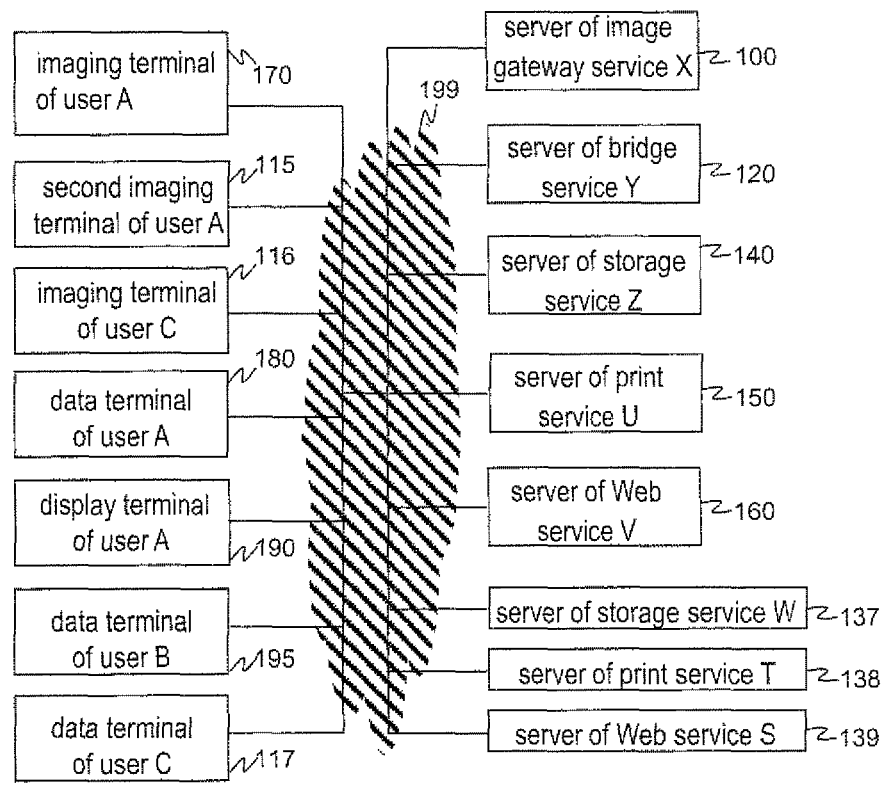
FIG. 1 is an exemplary structural diagram of an image data processing system related to one embodiment of the present invention.

FIG. 1 shows an example of an embodiment of the present invention and shows an exemplary structure of an image data processing system. The image data processing system which is an example of an embodiment of the present invention includes a server 100 of an image gateway service X, a server 120 of a bridge service Y, a server 140 of a storage service Z, a server 150 of a print service U, a server 160 of a Web service V, a server 137 of a storage service W, a server 138 of a print service T, a server 139 of a Web service S, an imaging terminal 170 of a user A, a second imaging terminal 115 of the user A, an imaging terminal 116 of a user C, a data terminal 180 of the user A, a display terminal 190 of the user A, a data terminal 195 of a user B, and a data terminal 117 of the user C and all these servers, data terminals and display terminals are connected by a network 199.

Furthermore, in the present specification and attached diagrams, the server 100 of the image gateway X is sometimes abbreviated to the server X, the server 120 of the bridge service Y to the server Y, the server 140 of the storage service Z to the server Z, the server 150 of the print service U to the server U, the server 160 of the Web service V to the server V, the server 137 of the storage service W to the server W, the server 138 of the print service U to the server U, and the server 139 of the Web service S to the server S. In addition, the imaging terminal 170 of the user A is sometimes abbreviated to the imaging terminal A, the data terminal 180 of the user to the data terminal A, the display terminal 190 of the user A to the display terminal A, and the data terminal 195 of the user B to the data terminal B. An image described in the present specification may be a still image or a motion image.

Figure 2:
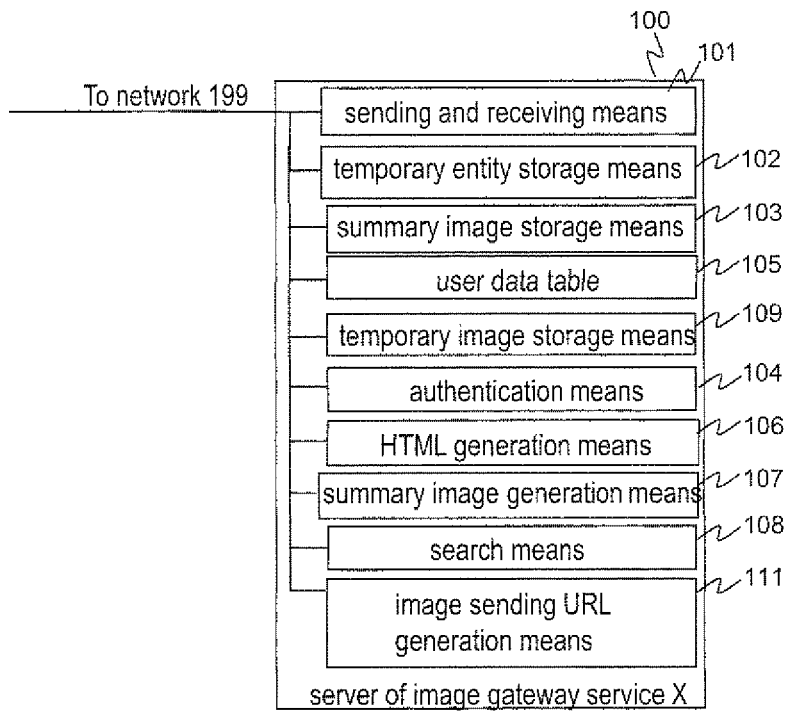
FIG. 2 is an exemplary structural diagram of a server X of an image data processing system related to one embodiment of the present invention.

FIG. 2 is an exemplary structural diagram of the server X 100. The server X includes a sending and receiving means 101 a temporary entity storage means 102, a summary image storage means 103, a user data table 105, a temporary image storage means 109, an authentication means 104, a HTML generation means 106, a summary image generation means 107, a search means 108, and a generation means 111 of an URL for sending image.

Figure 3:
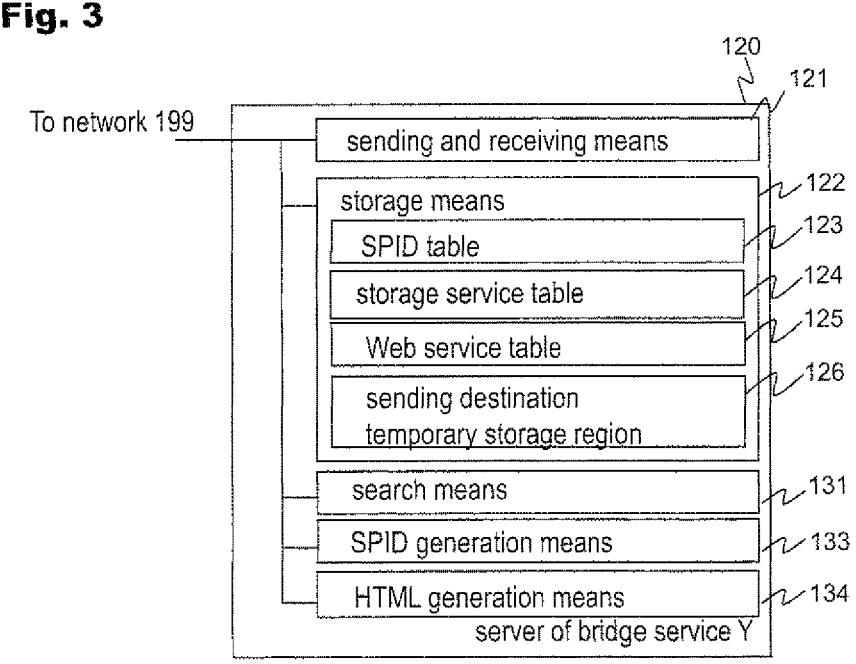
FIG. 3 is an exemplary structural diagram of a server Y of an image data processing system related to one embodiment of the present invention.

FIG. 3 is an exemplary structural diagram of the server Y 120. The server Y includes a sending and receiving means 121, a storage means 122, an SPID table 123, a storage service table 124, a Web service table 125, a sending destination temporary storage means 126, a search means 131, an SPID generation means 133, and an HTML generation means 134.

Figure 4:
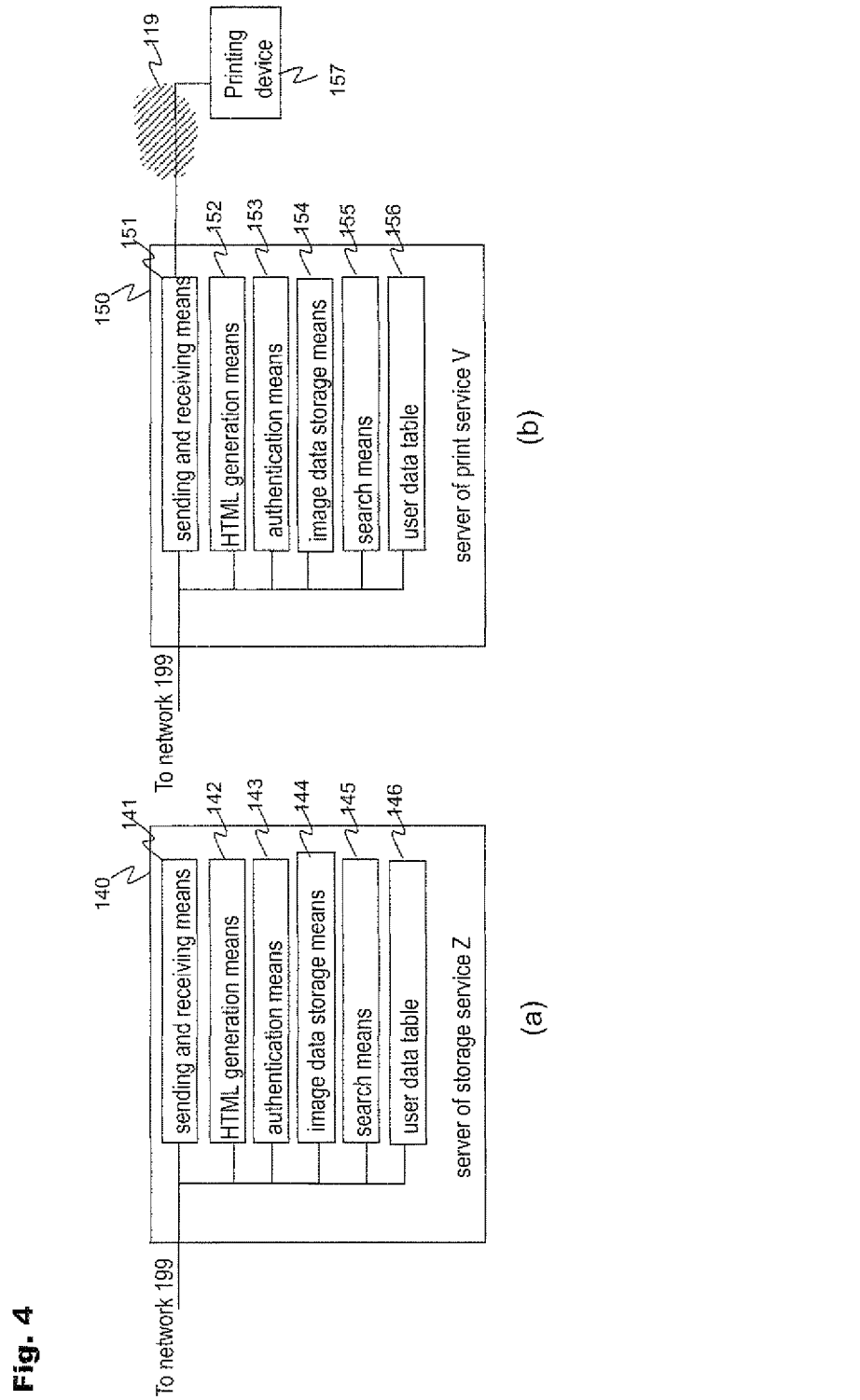
FIG. 4 is an exemplary structural diagram of an a server Y and a server U of an image data processing system related to one embodiment of the present invention.

FIG. 4 (*a*) is an exemplary structural diagram of the server Z 140. The server Z includes a sending and receiving means 141, an HTML generation means 142, an authentication means 143, an image data storage means 144, a search means 145, and a user data table 146. FIG. 4 (*b*) is an exemplary structural diagram of the server U 150. The server U includes a sending and receiving means 151, an HTML generation means 152, an authentication means 153, an image data storage means 154, a search means 155, and a user data table 156. In addition, the server U 150 is connected to a printing device 157 via a network 119. The network 119 may be the same as the network 199 or a different network.

Figure 5:
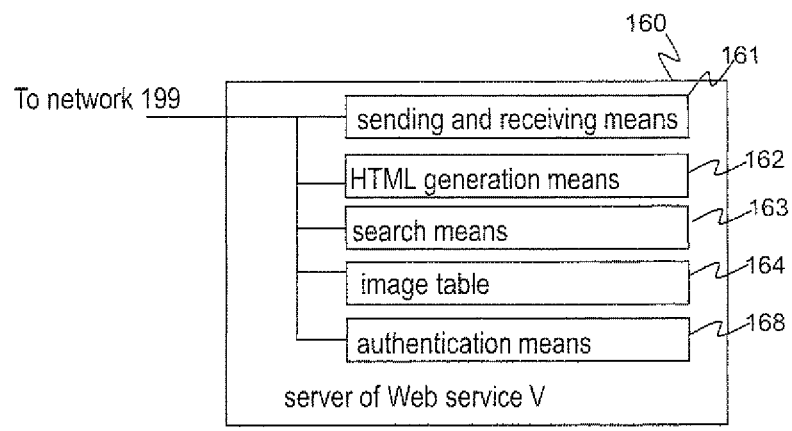
FIG. 5 is an exemplary structural diagram of server V of an image data processing system related to one embodiment of the present invention.

FIG. 5 is an exemplary structural diagram of the server V 160. The server V includes a sending and receiving means 161, an HTML generation means 162, a search means 163, a user data table 164, and an authentication means 168.

Figure 6:
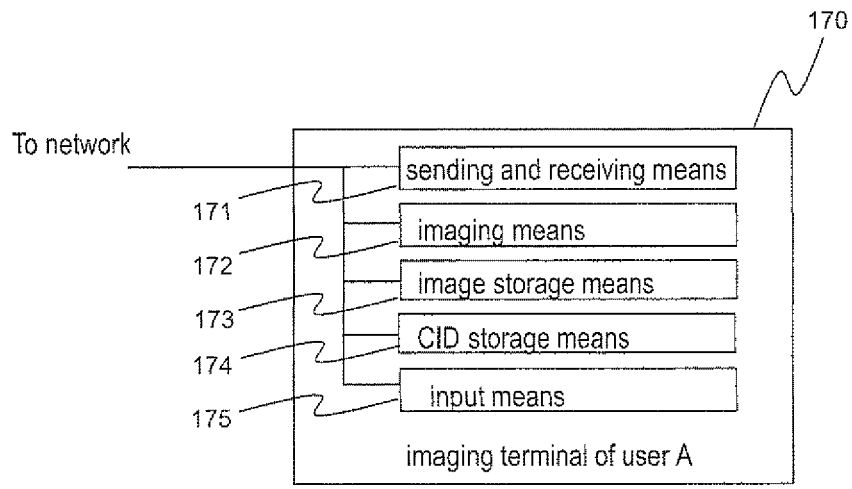
FIG. 6 is an exemplary structural diagram of an imaging terminal of an image data processing system related to one embodiment of the present invention.

FIG. 6 is an exemplary structural diagram of the imaging terminal A 170. The imaging terminal A includes a sending and receiving means 171, an imaging means 172, an image storage means 173, a CID storage means 174, and an input means 175. The imaging terminal A may or may not include the sending and receiving means 171.

Figure 7:
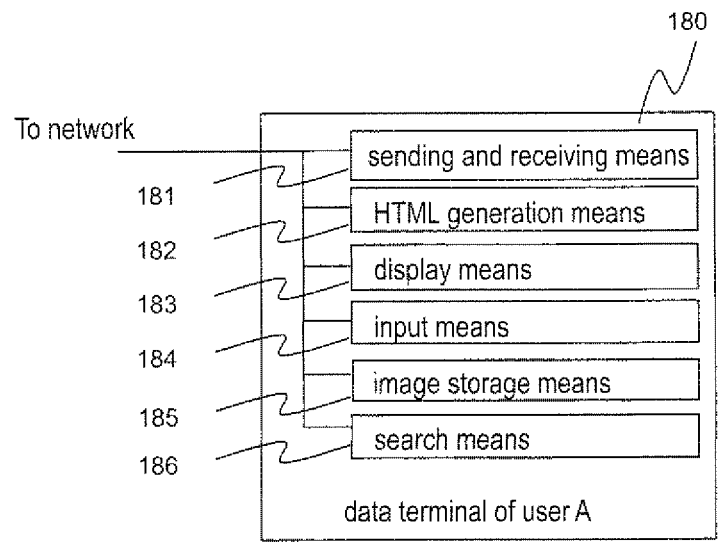
FIG. 7 is an exemplary structural diagram of a data terminal of an image data processing system related to one embodiment of the present invention.

FIG. 7 is an exemplary structural diagram of the data terminal A 180. The data terminal A includes a sending and receiving means 181, an HTML analysis means 182, a display means 183, an input means 184, an image storage means 185, and a search means 186.

Figure 8:
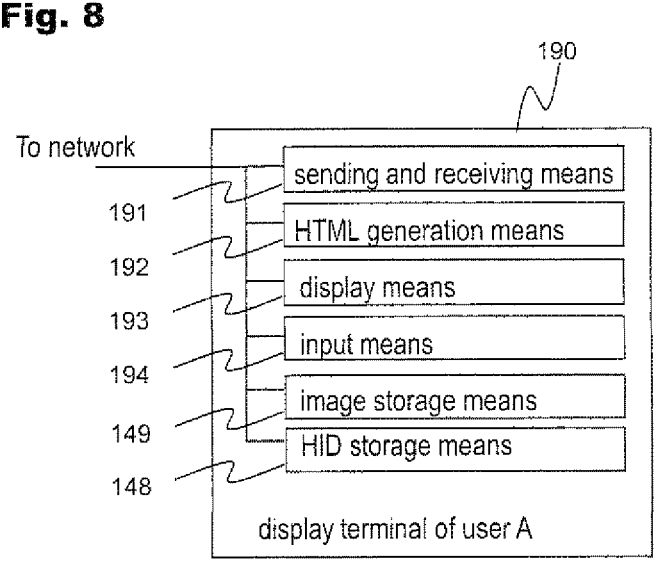
FIG. 8 is an exemplary structural diagram of an imaging terminal of an image data processing system related to one embodiment of the present invention.

FIG. 8 is an exemplary structural diagram example of the display terminal A 190. The display terminal A includes a sending and receiving means 191, an HTML analysis means 192, a display means 193, an input means 194, an image storage means 149, and an HID storage means 148.

Figure 9:
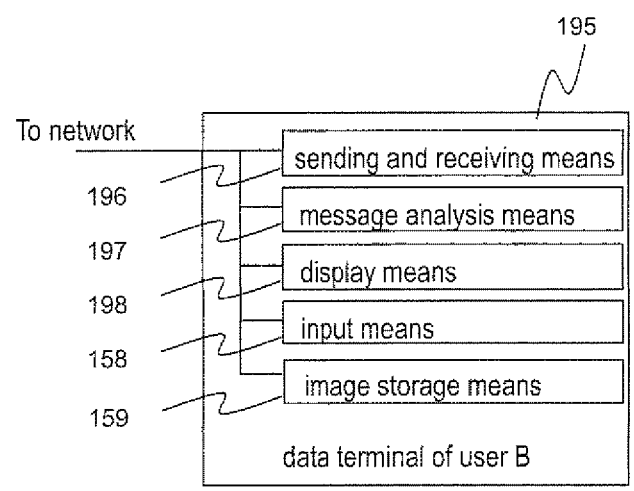
FIG. 9 is an exemplary structural diagram of a data terminal of an image data processing system related to one embodiment of the present invention.

FIG. 9 is an exemplary structural diagram example of the data terminal B 195. The data terminal B includes a sending and receiving means 196, a message analysis means 197, a display means 198, an input means 158, and an image storage means 159.

Furthermore, because the exemplary structures of the second imaging terminal 115 of user A and the imaging terminal of user C shown in FIG. 1 are the same as the imaging terminal of the user A shown in FIG. 6, an explanation with reference to the diagram is omitted. In addition, because the exemplary structure of the imaging terminal 117 of the user C shown in FIG. 1 is the same as the imaging terminal of the user A shown in FIG. 7, an explanation with reference to the diagram is omitted.

In the present specification, image data imaged by an imaging terminal and stored in an image storage means of the imaging terminal is called an original image. In addition, an image obtained by processing a certain original image is called a processed image of the original image. When comparing two images among certain original images or processed images, the image with a large amount of information is called an entity image and the image with a small amount of data is called a summary image. For example, when a RAW format original image is converted to a JPEG format (Joint Photographic Experts Group) which has a smaller amount of information, the original image is the entity image and the processed image of the original image is the summary image. Furthermore, in the case where two processed images are generated from one original image, the processed image with a large amount of information is the entity image and the processed image with a small amount of information is the summary image. An entity image may have any format such as RAW, JPEG, TIFF (Tagged File Format), or GIF (Graphics Interchange Format) inherent to each imaging terminal if the entity image is image data stored in an image storage means of an imaging terminal. A summary image may also have any format such as JPEG, RAW, PNG (Portable Network Graphic), TIFF, or GIF.

Figure 10:
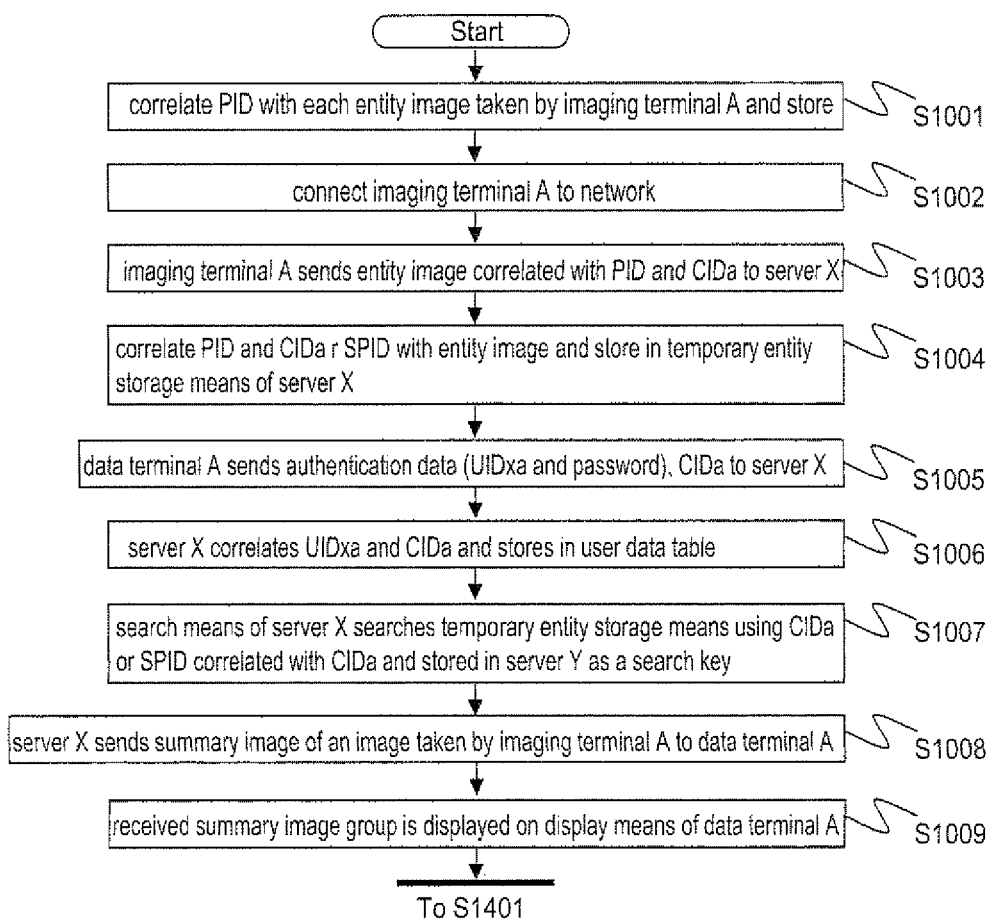
FIG. 10 is a flowchart of a process related to one embodiment of the present invention.
Figure 14:
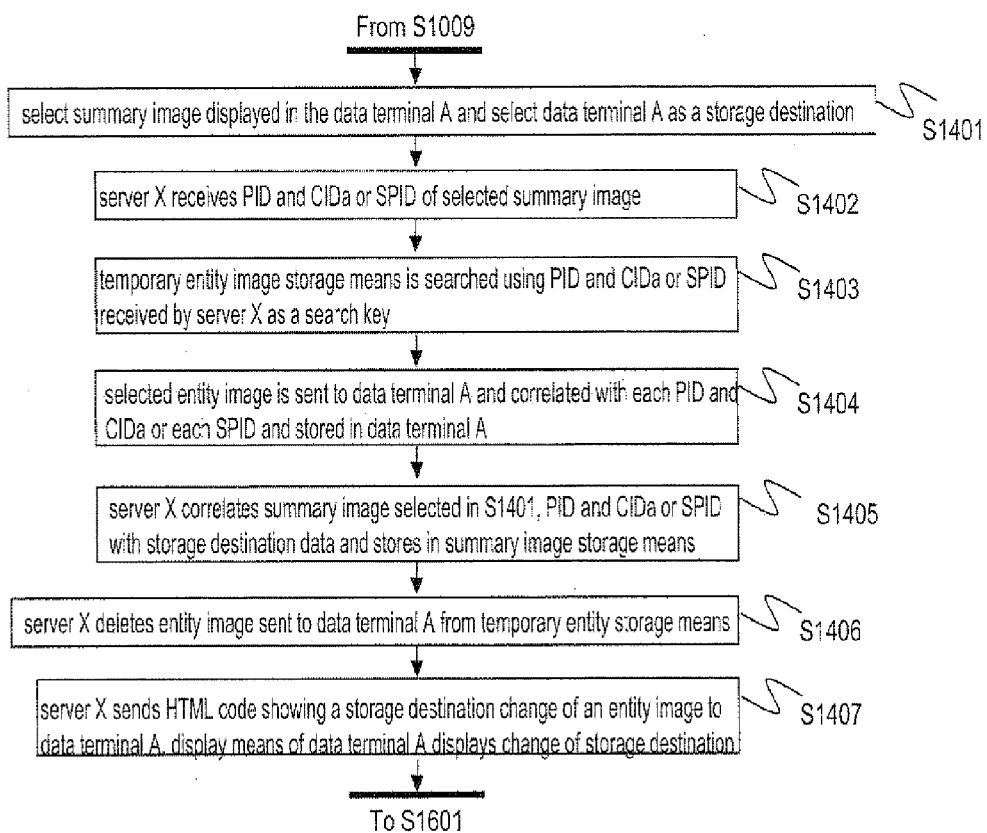
FIG. 14 is a flowchart of a process related to one embodiment of the present invention.
Figure 16:
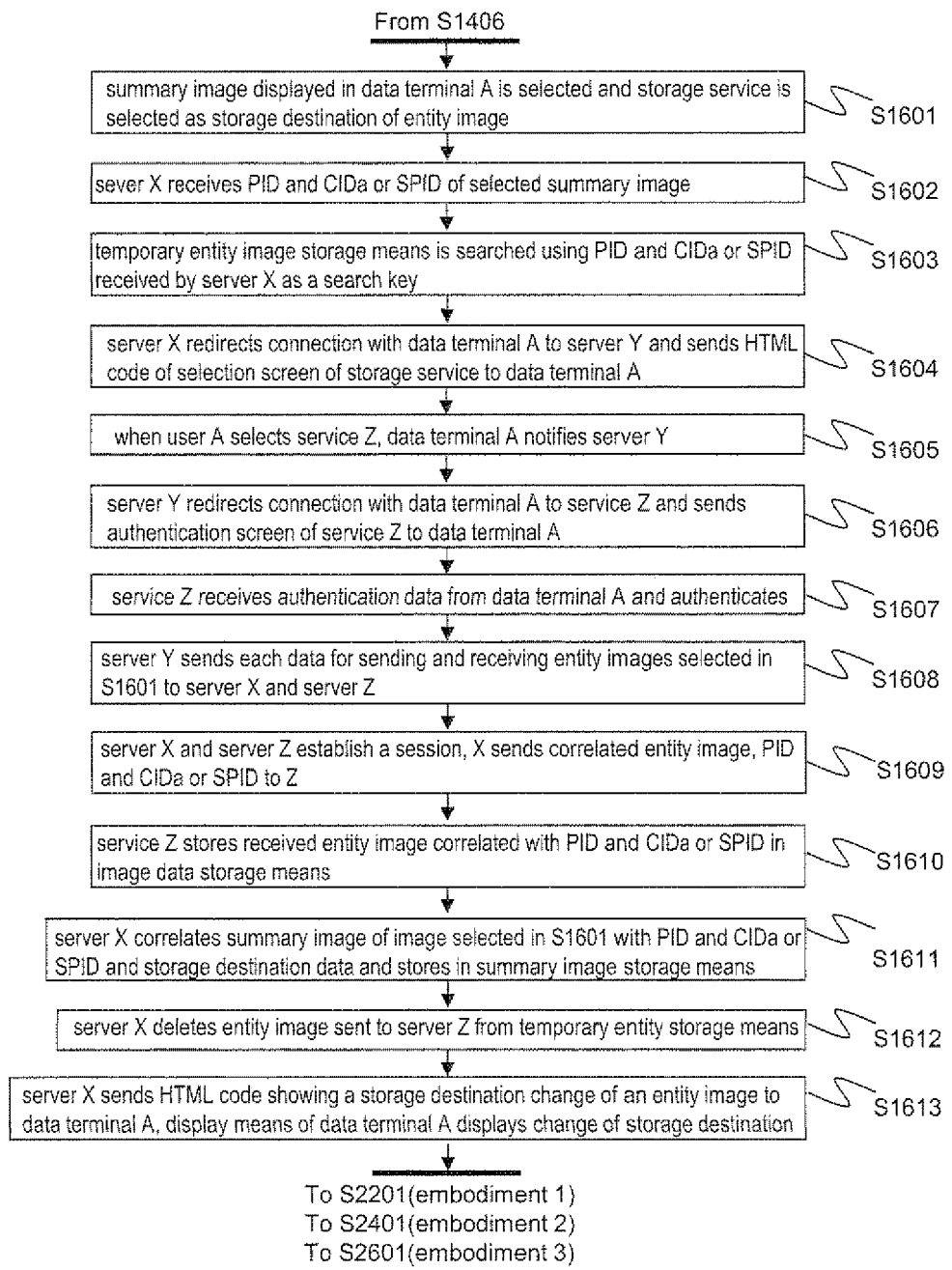
FIG. 16 is a flowchart of a process related to one embodiment of the present invention.

Three embodiments of the present invention are exemplified below. First, in the processes shown in the flowcharts in FIG. 10, FIG. 14 and FIG. 16, an entity image imaged by the user A using imaging the terminal A is stored between the server X, the data terminal A, and the server X. At this time, regardless of the storage location of the entity image, the user A treats the entity image as a single unified image using the image gateway service X as the only intermediate. The processes shown by the flowcharts in FIG. 10, FIG. 14, and FIG. 16 are common to all three embodiments, and each process in each embodiment is performed after step S1613 in FIG. 16. In the first embodiment explained in the flowchart of FIG. 22, regardless of the storage location of an entity image, a printing process of an image selected in the print server U is performed by the user A with server X as an intermediate. In the second embodiment explained in the flowchart of FIG. 24, regardless of the storage location of an entity image, a selected image is displayed by the display terminal A by the user A with server X as an intermediate. In the third embodiment explained in the flowchart of FIG. 26, regardless of the storage location of an entity image, the user A sends a selected image to the data terminal of the user B who is an acquaintance in the Web service V.

First, an explanation of the present invention starts with reference to the flowchart in FIG. 10. The user A takes images using the imaging means 172 by operating the input means 175 of the imaging terminal A and a plurality of imaged entity image groups are stored in the image storage means 173. At this time, each individual entity image among the entity image group imaged by the imaging terminal A is correlated with an ID for uniquely specifying that image and stored in the storage means 173 (step S1001). In the present specification, an ID for uniquely specifying an image among entity images imaged using the imaging terminal A is called a PID. In this example, a PID for specifying each entity image is correlated with each of the entity images taken by the user A and stored. When each entity image is taken and stored, the sending and receiving means 171 may or may not be connected to the network 199.

Next, the sending and receiving means 171 of the imaging terminal A is connected to the network 199 (step S1002). The sending and receiving means 171 sends the entity image group stored in the image storage means 173 in a state in which each image is correlated with a PID to the server X100 via the network 199. Furthermore, at this time, the sending and receiving means 171 sends an ID which can specify the imaging terminal A among all the imaging terminals after correlating with each entity image and PID (step S1003). In the present specification, an ID for specifying a certain imaging terminal among all the imaging terminals is called a CID. In addition, the CID of the imaging terminal A is called CIDa. CIDa is stored in the CID storage means 174 of the imaging terminal A.

In this example, the imaging terminal A includes the sending and receiving means 171 and is connected to the network 199 in step 1002. In the present invention, either of the following two processes may be performed instead of steps S1002 and S1003. In one method, the sending and receiving means 171 of the imaging terminal A and the sending and receiving means 181 of the data terminal A are not connected via network 199 but are directly connected and an entity image group stored in the image storage means 173 and a PID of each entity image are sent to the server X100 via the data terminal A. The second method can be applied to an information terminal without a sending and receiving means to a network. In this method, the user A detaches the image storage means 173 from the imaging terminal A170 and connects it to the input means 184 of the data terminal A. Following this, the user A extracts an entity images from the image storage means 173 and sends the entity images and each PID to the server X100. As in these two methods, an entity image stored in the image storage means 173 of the imaging terminal A may be sent to the server X100 via the data terminal A.

Furthermore, when sending an entity image group to the server X100 from the imaging terminal A170 and the data terminal A180, each entity image is correlated with a RD and sent to the server. However, a PID may be generated by the server X after an entity image is sent to the server X100 from the imaging terminal A or the data terminal A without being correlated with a PID.

Next, when the sending and receiving means 101 of server X receives the entity image group, PIDs correlated with each image and a CIDa, they are stored in the temporary entity storage means 102. That is, a PID for specifying each image and a CIDa are correlated with each entity image and stored in the temporary entity image means 102 (step S1004). The image gateway service X is used by a plurality of users. One user of the image gateway service X can also use a plurality of imaging terminals. As a result, entity images taken by different imaging terminals of a plurality of users are stored in the temporary entity storage means 102. However, each PID and a CID is correlated with all of the entity images stored in the temporary entity storage means 102 and stored. Therefore, any entity image stored in the temporary entity storage means 102 is specified when a combination of a PID and a CID is provided.

However, according to this method, the operator of the image gateway service X can know the entity images taken by user A by searching the entity images stored in the temporary entity storage means 102 using CIDa as a search key. This is often an undesirable situation from the viewpoint of privacy protection. The following methods are used to prevent the operator of the image gateway service X from being able to search entity images taken by each user.

First, the sending and receiving means 101 of the server X sends the CIDa and a PID group correlated with entity images sent from the imaging terminal A in step S1003 to the bridge server Y120 via the network 199. When the sending and receiving means 102 of the server X receives these, the SPI generation means 133 combines each of the PIDs in the received PID group and the CIDa and calculates a scrambled PID using an irreversible calculation F shown by the formula below. The scramble PID is notated by SPID.

$$SPIDn=F(PIDn,CIDa)$$

Here, the suffix n is a number which specifies each entity image among the entity images imaged by the imaging terminal A. In addition, the calculation F here satisfies $F(x1, y1) \neq F(x2, y2)$ in the case where $x1 \neq x2$ or $y1 \neq y2$. Due to this property, the SPID can be used as an ID for specifying each entity image among an entity image group stored in the temporary entity storage means. The generated SPID group is correlated with the CIDa and stored in the SPID table in the storage means 122 of server Y. The sending and receiving means 121 sends the generated SPID group to the server X via the network 199. When the sending and receiving mean 101 of the server X receives the SPID group, the SPID instead of a PID are correlated with each entity image sent from the imaging terminal A in step S1003 and stored in the temporary entity storage means 102 (step S1004). Because F is an irreversible calculation, the operator of the image gateway service X cannot get to an SPID from the CIDa. Therefore, the operator of the image gateway service X can no longer search for an entity image taken by user A using the CIDa.

Next, the user A performs a user registration in the image gateway service X using the data terminal A 180. The data terminal A may be any kind of data terminal such as a personal computer, a mobile phone, a mobile type data terminal, a camera, or a music player for example. The data terminal A may also be arranged with an imaging function. The user A inputs data for specifying the server X 100 by operating the input means 184. For example, a URL (Uniform Resource Locator) may be the data for specifying the server X 100. Next, the sending and receiving means 181 sends this data to the server X via the network 199. When the sending and receiving means 101 of the server X receives this data, the HTML generation means 106 generates an HTML code for a user data registration screen or an authentication screen. The sending and receiving means 101 sends the HTML code to the data terminal A via the network 180. When the sending and receiving means 181 receives the HTML code, the HTML analysis means 182 analyzes the code and this is displayed on a display means. Next, the user A inputs the data required for registering a user in the image gateway service X using the input means 184. In the case where the HTML code is for an authentication screen, the user A inputs the data required for authentication using the input means 184. The case of user registration is explained below.

Figures 11, 12:
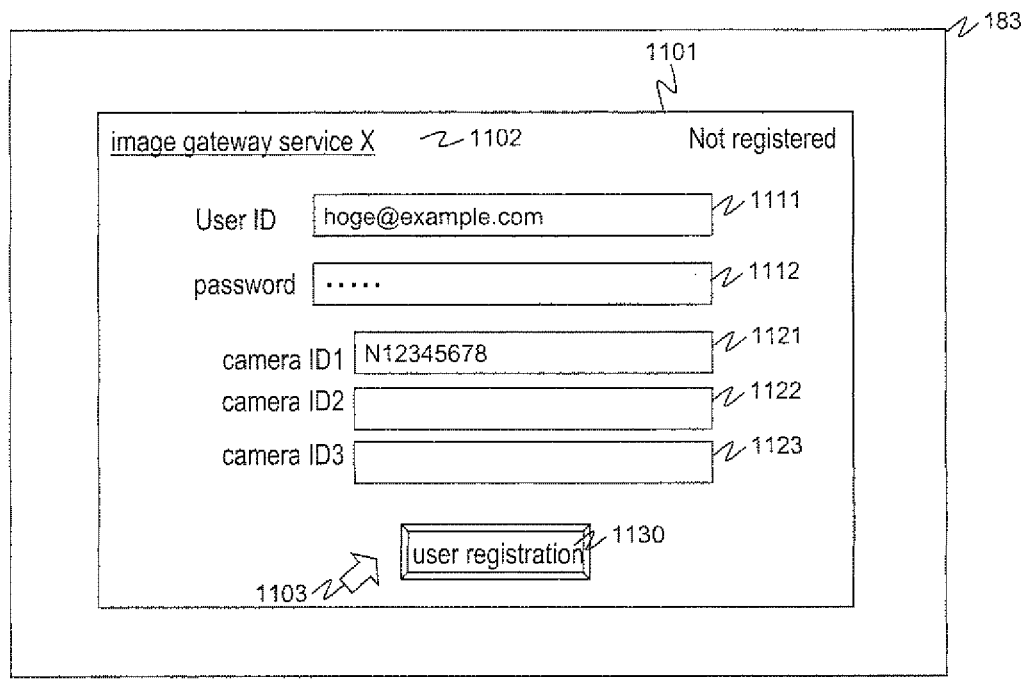
FIG. 11 is an exemplary diagram of a user registration screen related to one embodiment of the present invention.
FIG. 12 is an exemplary diagram of a user data table related to one embodiment of the present invention.

An example of a user registration screen is shown in FIG. 11. The display means 183 includes a user registration screen window 1101 of the image gateway service X. Furthermore, the window 1101 includes a display 1102 which displays the fact that this is a screen of the image gateway service X, a user ID input section 1111, a password input section 1112, a camera ID1 input section 1111, a camera ID2 input section 1122, a camera ID3 input section 1123 and a user registration button 1130. The user ID here is for uniquely specifying each user among the users of the image gateway service X. It is possible to input any number of camera IDs. In the present specification, a user ID in the image gateway service X is expressed as UIDx. In addition, a UID of user A in the image gateway service X is expressed as UIDxa. In the example shown in FIG. 11, "hoge@example.com" is input as UIDxa and "12345" is input as a password. However, in the example in FIG. 11, the display in the password input section 1112 is displayed in turned letters. Furthermore, a CID for uniquely specifying an imaging terminal held by user A is input to the camera ID input section. In the example shown in FIG. 11, "N12345678" is input as a CIDa. As is shown in the example in FIG. 11, in the present invention, it is possible to register a plurality of CIDs with respect to a single user ID. That is, the user A can use a plurality of imaging terminals in the present example. Any number of CIDs may be correlated with one UID and registered.

Furthermore, the user A moves a cursor 1103 displayed in the display means 183 using the input means 184 and selects the user registration button 1130. The sending and receiving means 181 sends UIDxa, a password, and CIDa to the server X100 via network 199 (step S1005). When the sending and receiving means of 101 of the server X receives these data, the user data table 105 correlates UIDxa, the password, and CIDa and stores them.

An example of the user data table 105 is shown in FIG. 12. The user data table includes a user ID column 1201, a password column 1202, a CID column 1203 and an HID column 1204. Although not shown in FIG. 12, the user data table may also include a column which stores attribute data of a user such as a name and an address, which are correlated with a user ID, and stored. In addition, the user data table may also be formed by a plurality of tables. In FIG. 12, data which is stored in step S1006 is stored as the user ID1211, the password 1212 and the CID 1213. In the user table 105 it is possible to correlate a plurality of CIDs with one user ID and to store them. In the user table 105 it is also possible to correlate a plurality of HIDs with one user ID and to store them. A correlation of a user ID of the image gateway service X and a CID of an imaging terminal held by this user is stored in the user table. In step S1006, it is also possible to correlate a plurality of CIDs with respect to a single UID and to store these in a column of the user table 1203. This is the case when a single user uses a plurality of imaging terminals. In the case where user A has completed the user registration of the image gateway service X in advance, it is enough to send the authentication data to server X.

Next, the search means 108 searches for an entity image group taken by the imaging terminal A from the temporary entity storage means 102 which stores the entity image group taken by a plurality of users using a plurality of imaging terminals. In step S1004, in the case where an entity image and a CID are correlated and stored in the temporary entity storage means 102, the search means 108 searches the temporary entity storage means 102 using the CIDa as a search key and thereby the entity image group taken by imaging terminal A is obtained (step S1007). In step S1004, in the case where an entity image and an SPID are correlated and stored in the temporary entity storage means 102, an entity image taken by the imaging terminal A is obtained using the following procedure. First, the sending and receiving means 101 sends the CIDa to the server Y120 via the network 199. When the sending and receiving means 121 of the server Y receives the CIDa, the search means 131 searches the SPID table and a SPID group correlated with the CIDa is obtained. The sending and receiving means 121 sends this SPID group to the server X100 via the network 199. The search means 108 of the server X searches the temporary entity storage means 102 using the SPID group as a search key (step S2007).

Next, the summary image generation means 107 of the server X generates a summary image group of the entity image group searched in step S1007. Next, the HTML generation means 106 of the server X generates an HTML code for displaying a list of the summary image group of images taken using the imaging terminal A using the generated summary image group. A PID or an SPID is correlated with each summary image. The sending and receiving means sends this HTML code to the data terminal A 120 via the network 199 (step S1008). When the sending and receiving means 181 of the data terminal A receives the HTML code, the code is displayed on the display means 183 after being analyzed by the HTML analysis means 182 (step S1009).

Furthermore, in this explanation, the storage of a summary image in the server X100 to the summary image storage means 103 is performed in step S1405 described below. However, following step S1008 described above, a summary image generated in step S1008 may be correlated with the CIDa and a PID or the SPID and stored in the summary image storage means 103.

Figure 13:
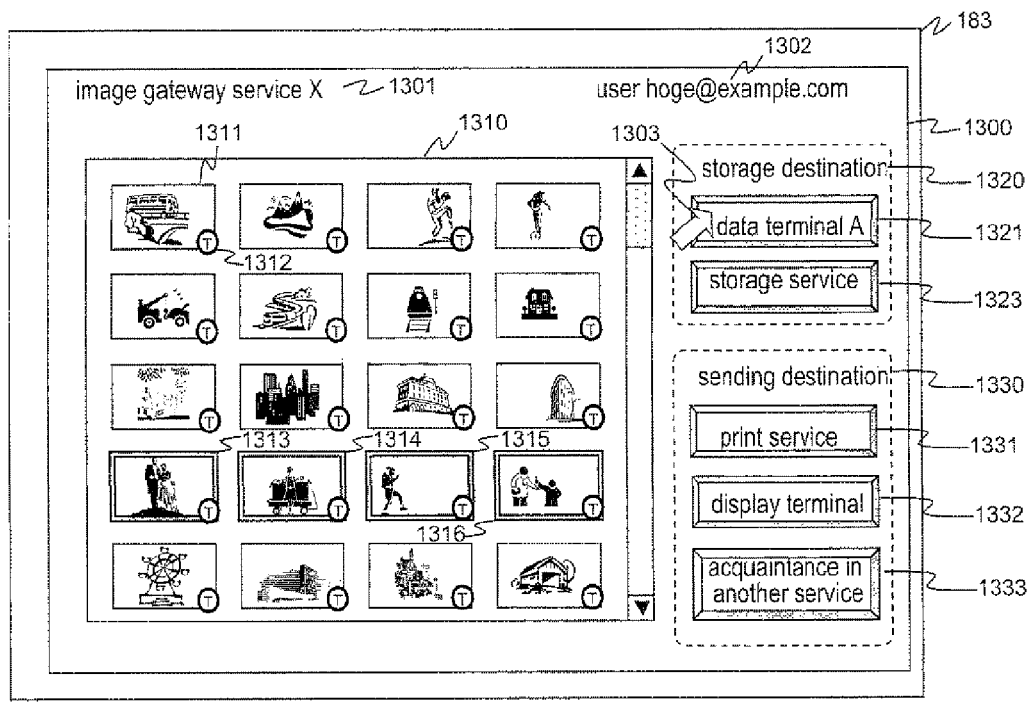
FIG. 13 is an exemplary diagram of a list display screen of a requested image group related to one embodiment of the present invention.

An example of a browsing display screen of a summary image group is shown in FIG. 13. The display means 183 includes a window 1300 of the browsing display screen. The browsing display screen window 1300 includes a display 1301 which displays the fact this is the image gateway service X and an authentication completed user data display 1302. The browsing display window 1300 further includes a summary image display area 1310, a storage destination selection button area 1320 and a sending destination selection button area 1330. The storage destination selection button area 1320 includes a button 1321 for data terminal A and a storage service button 1323. The sending destination selection button area 1330 includes a print service button 1331, a display terminal button 1332 and an acquaintance button of a different service 1333. The summary image of an entity image searched from the temporary entity storage means 102 in step S2005 is displayed in the summary image display window 1310. In addition, in the example in FIG. 13, a [T] mark attached to each summary image is displayed. The [T] mark expresses the fact that an entity image which is the source of each summary image is stored in the temporary entity image storage means 102. In FIG. 13, for example, the [T] mark 1312 attached to the summary image 1311 being displayed expresses the fact an entity image which is the source of the summary image 1311 is stored in the temporary entity image storage means 102. The method for displaying in the display means 183 indicating the fact that an entity image is stored in the temporary entity image storage means 102 does not require that a [T] mark be attached. Ant method may be used such as an explanation using an image, a color, a character or a separation by areas. A summary image of each entity image may be displayed in the summary image display area, a folder of summary images which express the fact that a plurality of entity images are collected in the folder may be displayed in the summary image display area, and a [T] mark mat be attached to the folder.

A process for storing an entity image group taken by the imaging terminal A170 in the temporary entity storage means 102 of the server X has been explained above using the flowchart shown in FIG. 10. Because it is also possible to store an entity image group taken by a second imaging terminal 115 of the user A in the temporary entity storage means 102 of the server X using the same process a detailed explanation is omitted here. In this case, an HID of the second imaging terminal 115 of the user A is input in a user registration screen or an authentication screen displayed in the data terminal A shown in FIG. 11, the HID is sent to the server X and the user ID 1211 of the user A is correlated with the CID column 1204 in the user data table 105 shown in FIG. 12 and stored. In addition, each entity image taken by the second imaging terminal of the user A is correlated with a PID and the CID of the second imaging terminal of the user A or the SPID and stored in the temporary entity storage means 102. In addition, in the present invention, the same processes as in FIG. 14, FIG. 16, FIG. 22, FIG. 24, and FIG. 26 are possible with respect to an entity image taken with the second imaging terminal of the user A and stored in the temporary entity storage means of the server X. A detailed explanation of a process of an entity image taken by the second imaging terminal of the user A is omitted here.

In addition, because it is also possible to store an entity image group taken by the imaging terminal 116 of the user C in the temporary entity storage means 102 of the server X using the same process a detailed explanation is omitted here. In this case, an HID of the second imaging terminal 116 of the user C is input in a user registration screen or authentication screen displayed in the data terminal C 117, the HID is sent to the server X and the user ID of the user C is correlated with the CID column 1204 in the user data table 105 shown in FIG. 12 and stored. In addition, each entity image taken by the imaging terminal 117 of the user C is correlated with a PID and the CID of the imaging terminal of the user C or an SPID and stored in the temporary entity storage means 102. In addition, in the present invention, the same processes as in FIG. 14, FIG. 16, FIG. 22, FIG. 24, and FIG. 26 are possible with respect to an entity image taken by the imaging terminal of the user C and stored in the temporary entity storage means of the server X. A detailed explanation of a process of an entity image taken by the imaging terminal of the user C is omitted here.

Next, a process following the process shown by the flowchart in FIG. 10 is explained using the flowchart shown in FIG. 14. Again referring to FIG. 13, the cursor 1303 displayed in the display means 183 is moved using the input means 184 of the data terminal A and an optional summary image is selected. In the example of FIG. 13, the summary images 1313, 1314, 1315, and 1316 are selected. In the example of FIG. 13, the summary image enclosed by a double line indicates that it is a summary image selected here. Next, the cursor 1303 displayed in the display means 183 is moved using the input means 184 of the data terminal A and the button 1321 of the data terminal A is selected as a storage destination (step S1401).

Then, the sending and receiving means of the data terminal A sends a PID and the CIDa or the SPUD correlated with the selected summary image or the information for specifying the data terminal A to the server X via network 199. The sending and receiving means 101 of the server X receives this data (step S1402). Here, a method for correlating a PID and the CIDa or an SPID with each summary image in step S1008 and sending to the data terminal A and sending the PID and the CIDa or the SPID of a summary image selected in step S1401 to the server X has been explained. However, a method is not limited to the method explained above. For example, it is not necessary to correlate a PID and the CIDa or an SPID in the data terminal A with each summary image. Any method may be used as long as the server X obtains a PID and the CIDa or an SPID of a summary image selected in step S1401.

Next, search means 108 searches the temporary entity storage means using a combination of the PID and the CIDa received in step S1402 as a search key or the SPID as a search key (step S1403). Next, the sending and receiving means 101 sends an entity image group to the data terminal A after each image in the entity image group obtained as a result of the search is correlated with the PID and the CIDa or the SPID. When the sending and receiving means 101 of the data terminal A receives the entity image group, the entity image group is stored in the image storage means 185 after each image is correlated with the PID and the CIDa or the SPID (step S1404).

Next, the server X correlates the PID and the CIDa or the SPID and data for uniquely specifying the data terminal A as storage destination data with each summary image group of an image selected in step S1401 and stores the summary image group in the summary image storage means 103 (step S1405). In the example shown in the present embodiment, the summary image group stored in step S1405 is generated by the summary image storage means 103 for use in an HTML code of the browsing display screen in step S1008. However, in the present invention the summary images stored in step S1405 may be generated by a separate process to that of step S1008. In addition, the summary images stored in step S1405 may be generated by the imaging terminal A and sent to the server X together with an entity image group. In addition, in the case where a summary image selected in step S1401 is already stored in the summary image storage means 103 in step S1008, it is not necessary to store the image in step S1405. Next, the temporary entity storage means 102 deletes the entity image group sent from the data terminal A in step S1404 (step S1406).

Using the processes described above, the entity image group taken by the imaging terminal A and which is temporarily stored in the server X is moved from the temporary entity storage means of the server X to the data terminal A. Using this type of process it is possible to prevent an increase in the amount of image data held by the image gateway service X.

Next, at an arbitrary time after step S1405 is performed, the HTML generation means of the server X generates HTML code for a renewed browsing display screen. The sending and receiving means 101 sends this HTML code to the data terminal A180 via the network 199. When the sending and receiving means 181 of the data terminal A receives the HTML code, the code is displayed is on the display means 183 after being analyzed by the HTML analysis means 182 (step S1407).

Figure 15:
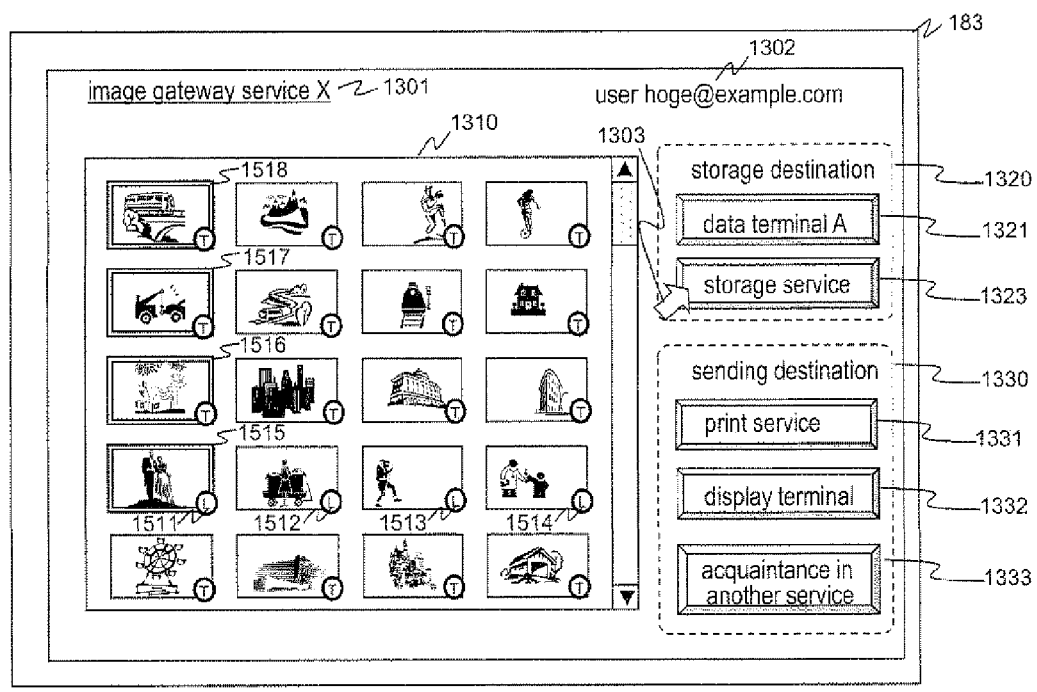
FIG. 15 is an exemplary diagram of a browsing display screen renewed by a process related to one embodiment of the present invention.

An example of a renewed browsing display screen is shown in FIG. 15. The screen shown in FIG. 15 is the same as the display in FIG. 13 except the display of the summary image display area 1310. Using the processes in steps S1401 to S1406, the entity images represented by the summary images 1313, 1314, 1315, and 1316 in FIG. 13 are moved from the temporary entity storage means 102 of the server X to the image storage means 185 of the data terminal A. When FIG. 13 and FIG. 15 are compared, the mark attached to a summary image which represents these four entity images changed from a [T] mark to an [L] mark. An [L] mark expresses the fact that the entity images corresponding to each summary image are stored in the image storage means 185 of the data terminal A. The attachment of an [L] mark is not necessary for representing this fact. As long as the method distinguishes between an entity image stored in the temporary storage means 102 and an entity image stored in the storage means 185 of the data terminal A, an explanation using an image, color, a character, or a separation by area may also be used. A summary image of representing each entity image may be displayed in the summary image display area, a folder of summary images which express the fact that a plurality of entity images are collected in the folder may be displayed in the summary image display area, and an [L] mark may be attached to the folder.

Next, a process whereby an entity image of the image selected by the user A among an entity image group taken in step A1001 and stored in the temporary entity storage means 102 is copied to the image data storage means 144 of the storage service Z, only the summary image group is stored in the summary image storage means of the server X and these selected entity image groups are deleted from the temporary entity storage means 102 is explained using the flowchart shown in FIG. 16. Again referring to FIG. 15, the cursor 1303 displayed in the display means 183 is moved using the input means 184 of the data terminal A and an arbitrary summary image is selected. In the example in FIG. 15, the summary images 1515, 1516, 1517, and 1518 are selected. In the example of FIG. 15, the summary image enclosed by a double line indicates that it is a summary image selected here. Furthermore, the cursor 1303 displayed in the display means 183 is moved using the input means 184 of the data terminal A and the button 1323 of the storage service is selected as a storage destination (step S1601).

Next, the sending and receiving means 181 sends each PID and the CIDa of the selected summary images 1515, 1516, 1517, 1518 or the SPID and the information representing the fact that the storage service button 1323 is selected to the server X100 via network 199. The sending and receiving means 101 of server X receives this data (step S1402). Here, a method for correlating the PID and the CIDa or the SPID with each summary image in step S1407 and sending to the data terminal A and sending the PID and the CIDa or the SPID of the summary image selected in step S1601 to the server X has been explained. However, in the present invention, a method is not limited to the method explained above. For example, it is not necessary to correlate the RD and the CIDa or the SPID in the data terminal A with each summary image. Any method may be used as long as the server X obtains the PID and the CIDa or the SPID of the summary image selected in step S1601. Next, search means 108 searches the temporary entity storage means using a combination of the PD and the CIDa received here as a search key or the SPID as a search key (step S1603). However, in this example, the summary image 1515 is attached with a mark [L] as is shown in FIG. 15. This represents the fact that the summary image is deleted from the temporary entity storage means 102 of the server X in step S1406 and the entity image represented by this summary image is stored in the image storage means 184 of the data terminal A. Therefore, the entity image indicated by the summary image 1515 must be obtained from the data terminal A after the server X100 sends the PID and the CIDa or the SPID to the data terminal A180. In this way, in the case where the entity image doesn't exist in the temporary entity storage means 102 of the server X, the entity image is obtained by the server X from a data terminal or a server which stores the entity image. Because this process is explained in detail in steps S2204 to S2206, step S2404 to S2406 and step S2604 to S2606, it is omitted here.

Figures 17, 18:
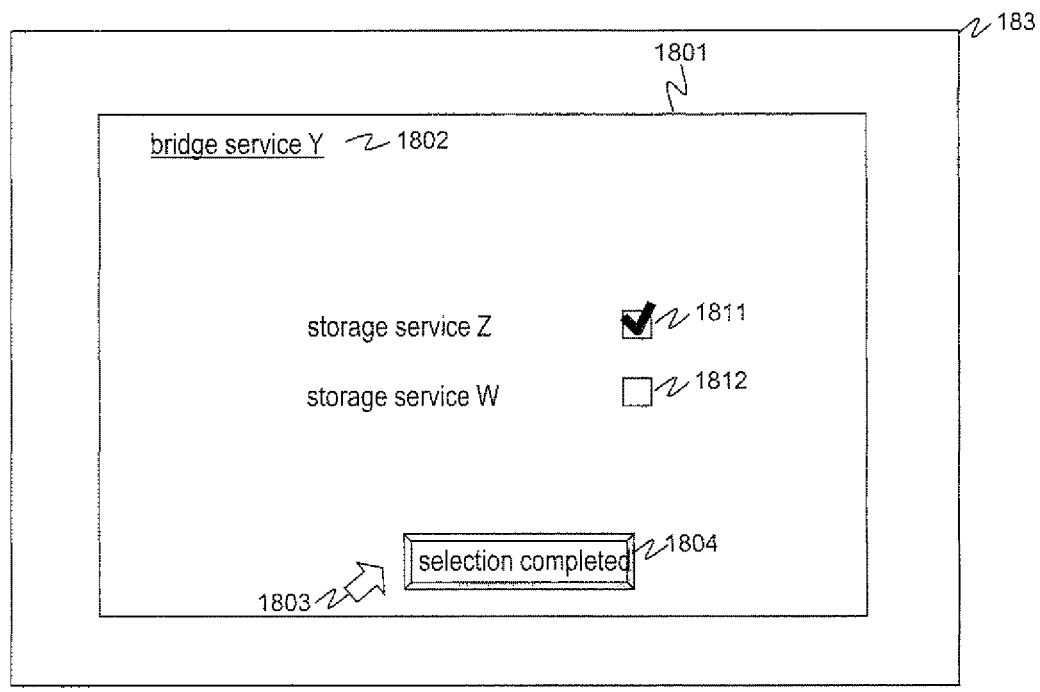
FIG. 17 is an exemplary diagram of a storage service table in a server Y related to one embodiment of the present invention.
FIG. 18 is an exemplary diagram of a storage service selection screen provided by a server Y related to one embodiment of the present invention.

Next, the sending and receiving means 101 redirects a connection between the data terminal A180 and the sever X100 to the server Y120 using the data received in step S1602 which expresses the fact that the button 1323 of the storage service is selected. Next, the HTML generation means 134 generates HTML code for generating a storage service selection screen using the data of the storage service stored in the storage service table 124 in server Y. An example of the storage service table 124 is shown in FIG. 17. The storage service table 124 includes a storage service name column 1701, an authentication URL column 1702, and a sending URL column 1703. In the example of the present embodiment, a bridge service Y provides a bridge services to two storage services, a storage service Z, and a storage service W are provided to a user. Furthermore, the storage service Y and the storage service Z may be any service as long as they provide a storage function of image data. For example, as long as the storage services used in the present invention provide a storage function of image data, a service which mainly provides storage and a browsing function of images (FLICKR etc.), or a service (FACEBOOK etc.) which mainly provides an exchange of diaries such as an SNS (Social Networking Service) or a service which mainly provides electronic mail (GMAIL etc.) can be used.

Next, the sending and receiving means 121 sends the HTML code to the data terminal A via the network 199 (step S1604). When the sending and receiving means 181 of the data terminal A receives the HTML code, the display means 183 displays the storage service selection screen after the code is analyzed by the HTML analysis means 182. An example of the storage service selection screen is shown in FIG. 18. The window 1801 of the storage service selection screen includes a display 1802 which indicates that this is a service of the bridge service Y, a checkbox 1811 for selecting the storage service Z, a checkbox 1812 for selecting the storage service W, and a selection completed button 1804. The storage service selection screen may or may not include the bridge service display 1802. In addition, the checkbox 1811 and 1812 may be any type of checkbox as long as it is possible to select each storage service. In addition, it may be possible to select one storage service or a plurality of storage services simultaneously. In this example, when the storage service selection screen is displayed, the HTML generation means of the server Y generates HTML code and sends the code to the data terminal A after the connection to the data terminal A is redirected from the server X100 to the server Y120. Other than this, a code such as a script (javascript etc.) for receiving data from the server Y is attached in advance to the HTML code sent to the data terminal A from the server X, and the storage service selection screen output by the server Y may be directly displayed on the screen of the image gateway service X. Furthermore, the server X may include a function equivalent to a storage service table and the server X may send the storage service selection screen to the data terminal A.

Next, the cursor 1803 displayed on the display means 183 is moved using the input means 184 of the data terminal A and the checkbox for selecting a storage service is selected. In the example of FIG. 18 the checkbox 1811 is selected. Following this, the cursor 1803 is moved using the input means 184 and the selection completion button 1804 is selected. The sending and receiving means 181 sends data which expresses the fact the checkbox 1811 is selected to the server Y120 via the network 199 (step S1604). When the sending and receiving means 121 of the server Y receives this data, the search means 131 searches the storage service table 124 for the authentication URL 1712 correlated and stored with the storage service Z. The sending and receiving means 121 redirects a connection between the terminal A and the server Y to the server Z 140 according to the authentication URL 1712.

Figure 19:
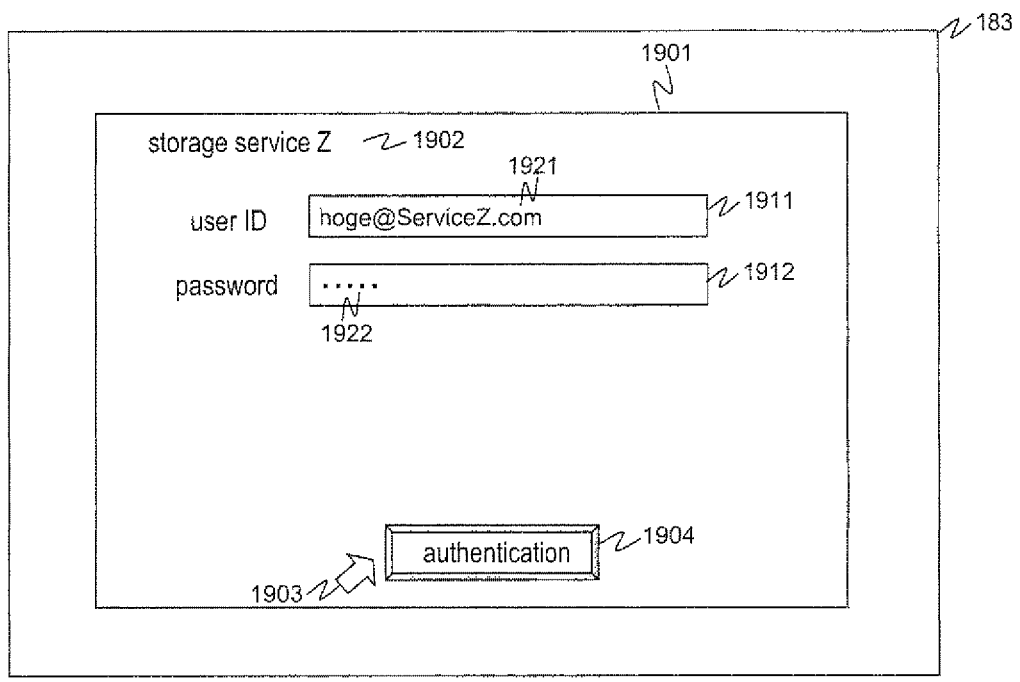
FIG. 19 is an exemplary diagram of an authentication screen provided by a server Z related to one embodiment of the present invention.

When the sending and receiving means 141 establishes a connection with the data terminal A, the HTML generation means 142 generates an HTML code for generating an authentication screen of the storage service Z and the sending and receiving means 141 sends the code to the data terminal A via the network 199 (step S1606). When the sending and receiving means 181 of the data terminal A receives the code, an authentication screen of the storage service Z is displayed on the display means 183 after the code is analyzed by the HTML analysis means 182. An example of the storage service Z authentication screen is shown in FIG. 19. The storage service Z authentication screen includes an authentication screen window 1901. The authentication screen window 1901 includes a display 1902 which expresses the fact that this is a screen of the storage service Z, a user ID input section 1911, a password input section 1912 and an authentication button 1904. In the example in FIG. 19, after the cursor 1903 is moved to the user ID input section 1911 using the input means 184, the user ID [hoge@ServiceZ.com] of the user A in the service Z is input and the password 1922 is input after moving the cursor 1903 to the password input section 1912. Here, the user ID of the storage service Z is expressed as UIDz. In addition, the UID of the user A in the storage service Z is expressed as UIDza. In the example in FIG. 19, the password 1922 is displayed as turned characters. Next, when the cursor 1903 is moved by the input means 184 and the authentication button 1904 is selected, the sending and receiving means 181 sends the user ID 1921 and the password 1822 to the server Z via the network 199. When the user ID and the password are received by the sending and receiving means of the server Z, the authentication means 143 performs an authentication by searching for the UIDza and the password data of the user A stored in advance in the user table (step S1607). Here, it is presumed that the UIDza and the password of the user A are stored in advance in the user data table 146. That is, the user A is a user of the image gateway service X as well as a user of the storage service Z. In the case where the user A is not a user of the storage service Z at the time when step S1606 is performed, the UIDza and the password are stored in server Z at this time.

Next, the sending and receiving means 141 of the server Z sends data which expresses that fact that the user A is authenticated to the server Y120 via the network 199. When the sending and receiving means 121 of the server Y receives this data, the sending and receiving means 121 of the server Y sends to the server X100 data required for sending an entity image of the user A selected in step S1601 to the server Z 140. This data may be an ID for uniquely specifying the server Z 140 which is a sending destination on network 199, a receiving address or a port number when receiving an entity image group in the server Z 140, a session data generated for sending this data by the server Y or a negotiation data between the server X and the server Z or a digest data of an image data for guaranteeing security or accuracy of the entity image group. However, any data may be used as long as it is used for sending an entity image group selected in step S1601 to the server Z 140 from server X 100. In addition, the sending and receiving means 121 of the server Y sends data necessary for receiving an entity image group of an image selected in step S1601 from the server X100 to the server Z140. This data may be an ID for uniquely specifying the server X100 which is a sending destination on network 199, a receiving address or a port number when receiving an entity image group in the server X100, a session data generated for sending this data by the server Y or a negotiation data between the server X and the server Z or a digest data of image data for guaranteeing security or accuracy of the entity image group. However, any data may be used as long as it is used for sending an entity image group selected in step S1601 to the server Z140 from the server X100 (step S1608). In this example, the server Y performs negotiation for sending and receiving entity image groups between the server X and the server Z for sending and sending and receiving of entity image groups is directly carried out between the server X and the server Z via the network 199. However, the server Y may relay sending and receiving of entity image groups. In addition, the server Y does not have to perform negotiation and a negotiation may be performed directly between the server X and the server Z.

Next, the sending and receiving means 101 of the server X and the sending and receiving means 141 of the server Z receive data sent from the server Y 120 in step S1608. Next, the sending and receiving means 101 of the server X and the sending and receiving means 141 of server Z the establish a session for sending and receiving the entity image group selected in step S1601. The sending and receiving means 101 of the server X sends the entity image group of an image selected in step S1601 correlated with each PID and the CIDa or each SPID to the sever Z via network 199 (step S1609). The sending and receiving means 141 of the server Z receives the entity image group and stores them in the image data storage means 144 correlated with each PID and the CIDa or each SPID (step S1610).

Next, the server X correlates each PID and the CIDa or each SPID and the information which uniquely specifies the storage service Z as storage destination data with each summary image group of an image selected in step S1601 and stores the summary image group in the storage means 103 (step S1611). In the example shown here, the summary image storage means 103 generates the summary image group stored in step S1611 for use in an HTML code of a browsing display screen in step S1008. However, in the present invention, the summary images stored in the summary image storage means 103 in step S1611 may be generated independently in step S1008. In addition, in the case where summary images selected in step S1601 are already stored in the summary image storage means 103 in step S1008, it is not necessary to store them in step S1611. In addition, the summary images stored in the summary image storage means 103 in step S1611 may be generated by the imaging terminal A and sent to the server X with an entity image group. Next, the temporary entity storage means 102 of the server X deletes the entity image group sent from the data terminal A in step S1609 (step S1612).

Next, at an arbitrary time after step S1611 is performed, the HTML generation means of the server X generates an HTML code for a renewed image data browsing display screen. The sending and receiving means 101 sends this HTML code to the data terminal A180 via the network 199. When the sending and receiving means 181 of the data terminal A receives the HTML code, the code is displayed on the display means 183 after being analyzed by the HTML analysis means 182 (step S1613).

Figure 20:
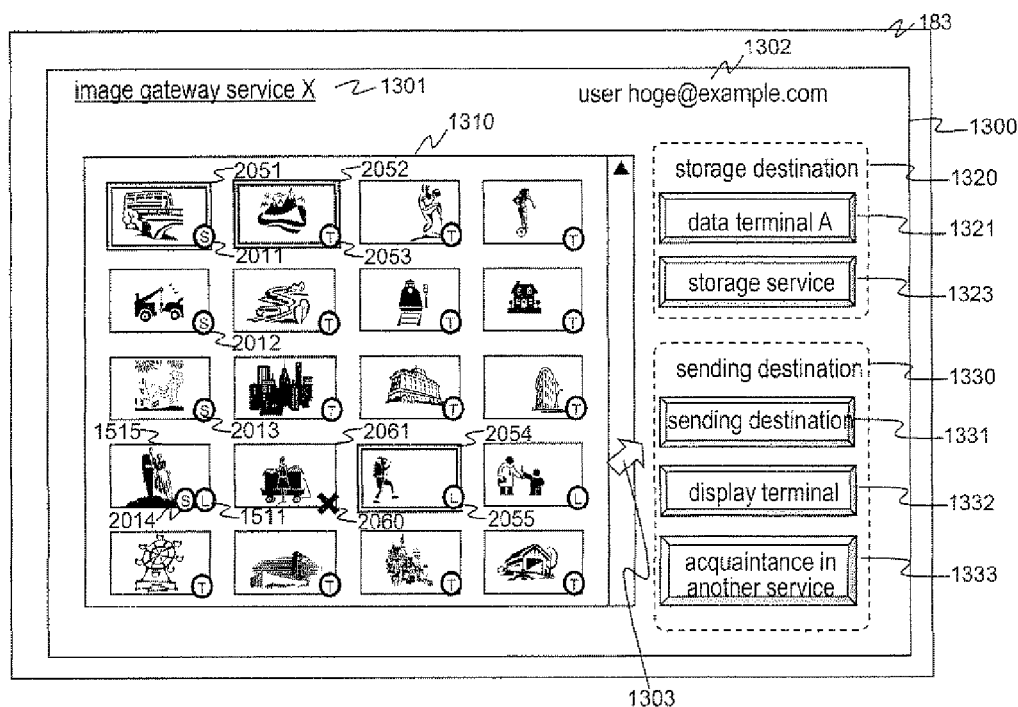
FIG. 20 is an exemplary diagram of a renewed browsing display screen provided by a server X related to one embodiment of the present invention.

An example of a renewed browsing display screen is shown in FIG. 20. The screen shown in FIG. 20 is the same as the display in FIG. 13 and FIG. 15 except the display of the summary image display area 1310. Using the processes in steps S1601 to S1613, the entity image group represented by the summary images 1516, 1517, 1518, and 1519 in FIG. 15 are moved from the temporary entity storage means 102 of the server X to the image storage means 144 of the server Z. In addition, the entity image group represented by the summary image 1515 in FIG. 15 is copied to the image data storage means of the server Z from the image storage means 185 of the data terminal A. When FIG. 15 and FIG. 20 are compared, the display attached to the summary images 1516, 1517, and 1518 among these images changes from a [T] mark to an [S] mark. An [S] mark expresses the fact that the entity images which represent each summary image or the summary images are stored in the image storage means 144 of the server Z. The attachment of an [S] mark is not necessary for representing this fact. As long as the method distinguishes between an entity image stored in the temporary storage means 102 of the server X and an entity image stored in the storage means 185 of the data terminal A, and an entity image or summary image stored in the image data storage mean 144 of the server Z, an explanation using an image, a color, a character or, a separation by area may also be used. In addition to mark [L] 1515 which represents the fact the entity image with respect to the summary image 1515 is stored in the image storage means 185 of the data terminal A, an [S] mark 2016 which is stored in the image data storage means 144 of the server Z is also attached to the entity image or summary image. This expresses the fact that an image represented by the summary image 1515 is stored in both the image storage means 185 of the data terminal A and the image data storage means 144 of the server Z.

Figure 21:
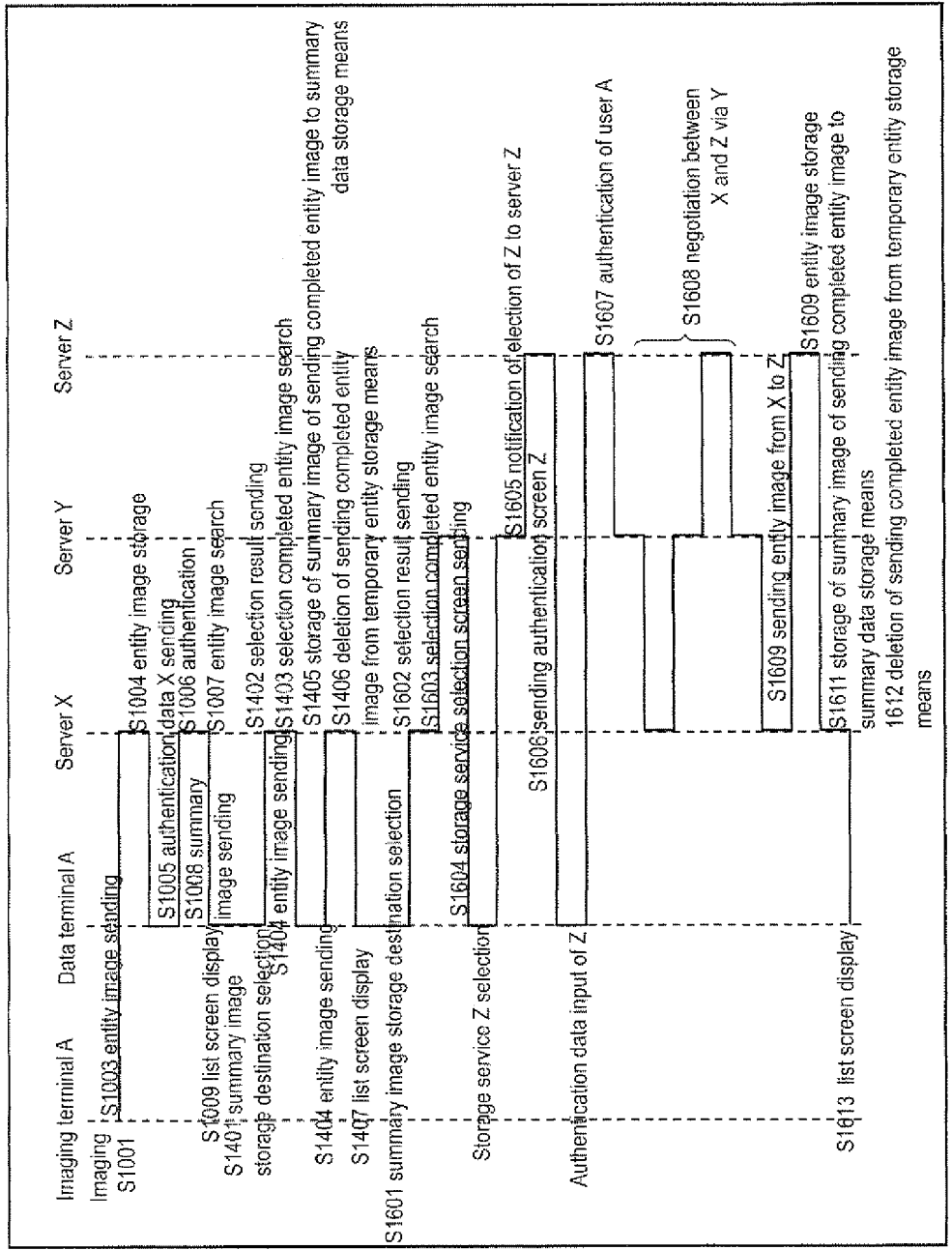
FIG. 21 is a sequence diagram of a process related to one embodiment of the present invention, FIG. 22 a flowchart of a process related to one embodiment of the present invention, FIG. 23 in an example diagram of an authentication screen in a print service related to one embodiment of the present invention.

Furthermore, an SPID generation and storage function in the server Y120 and another bridge function provided by the server Y may be realized by different servers. In addition, these different servers may be operated by different operators The processes of the first embodiment of the present invention shown in each flowchart in FIG. 10, FIG. 14, and FIG. 16 are organized together and shown in the sequence shown in FIG. 21. FIG. 21 shows each step explained in each flowchart described above is processed in which of the imaging terminal, the data terminal, or the server. By the processes described above, a summary image of all images taken by the imaging terminal A is stored in the summary image storage means 103 of the server X. The entity image of the summary image is stored in the temporary entity storage means 102 of the server X, the image storage means 185 of the data terminal A and the image data storage means 144 of the storage service Z. In this state, the user A can use various services such as printing images, displaying images on a display terminal or sending image data to another user using the image gateway service X as an entrance.

A print process of an image using a print service U is explained as a first embodiment with the processes shown in FIG. 21 as common processes after step S1613, image display using a display terminal A is explained as a second embodiment, and a process whereby user A sends image data to a user B who is an acquaintance on a Web service V is explained. All three embodiments start at step S1613. That is, in each of the three embodiments, a process begins from a state where a browsing display screen of the summary images shown in FIG. 20 is displayed in the display means 183 of the data terminal A.

(First Embodiment: Printing Using a Print Service U)

Figure 22:
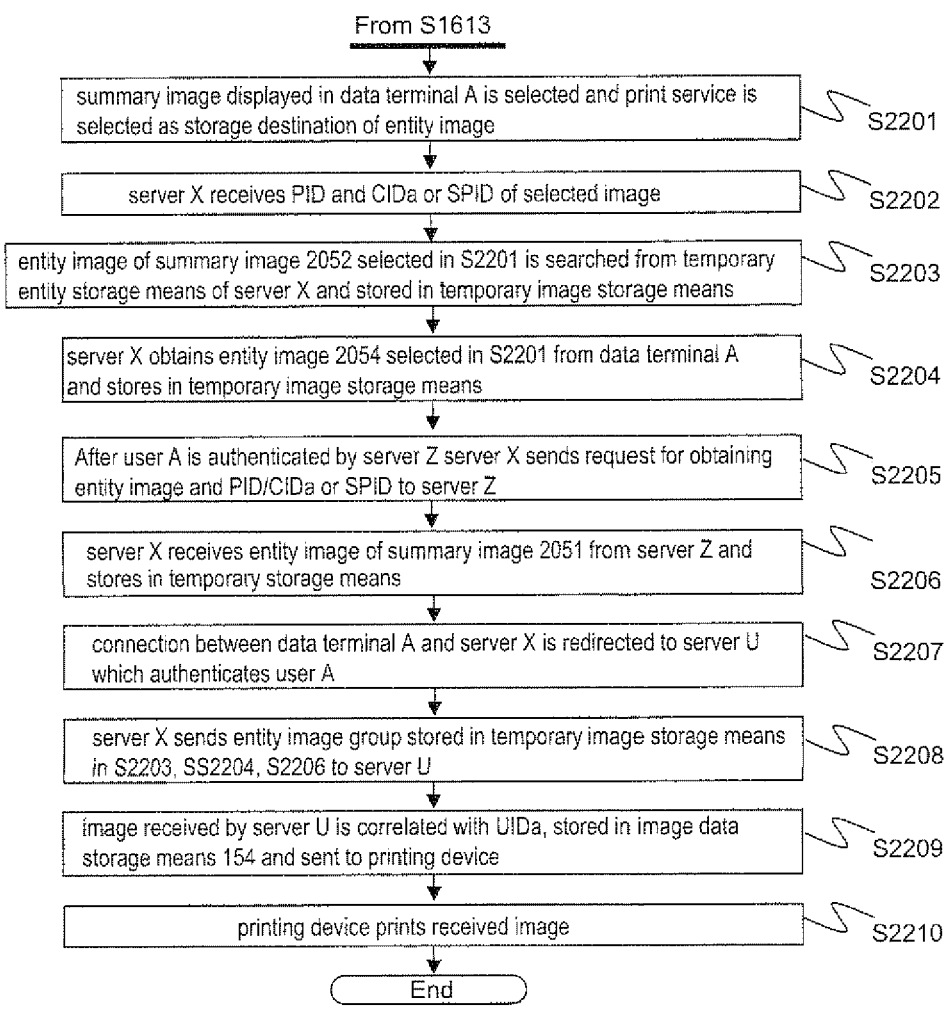

Next, a process for batch printing a plurality of images of which entity images are stored in different terminals or servers using a print service U via an image gateway service X is explained using the flowchart shown in FIG. 22. Again referring to FIG. 20, the cursor 1303 displayed in the display means 183 is moved using the input means 184 of the data terminal A and an arbitrary summary image is selected. In the example in FIG. 20, summary images 2051, 2052, and 2054 are selected. In FIG. 20, the summary image enclosed by a double line refers to the fact that it is a selected image at this time. In the example shown in FIG. 20, a [T] mark 2053 is attached to the summary image 2052 and an entity image represented by this summary image is stored in the temporary entity storage means 102 of the server X. Similarly, an [L] mark 2055 is attached to the summary image 2054 and an entity image represented by this summary image is stored in the image storage means 185 of the data terminal A. Furthermore, an [S] mark 2011 is attached to the summary image 2051 and an entity image represented by this summary image is stored in the image data storage means 144 of the server Z. Next, the cursor 1303 displayed on the display means 183 is moved using the input means 184 of the user A and a button 1331 for a print service is selected as a sending destination (step S2201).

Next, the sending and receiving means 181 sends each of the PID and the CIDa or each SPID of each selected summary image 2051, 2052, and 2054 and information which expresses the fact that the button 1331 for the print service is selected is sent to the server X100 via the network 199. Here, any data which expresses the fact that the summary images 2051, 2052, and 2054 are selected may be sent instead of the PID and CIDa or the SPID of the selected summary image. The sending and receiving means 101 of the server X receives this data (step S2202). Here, a method for correlating each of the PID and the CIDa or each SPID with each summary image in step S1613 and sending to the data terminal A and sending the PID and the CIDa or the SPID of the summary image selected in step S2201 to the server X has explained. However, a method is not limited to the method explained above. For example, it is not necessary to correlate each of the PID and the CIDa or the SPID in the data terminal A with each summary image. Any method may be used as long as the server X obtains the PID and the CIDa or the SPID of the summary image selected in step S2201.

Next, search means 108 searches the temporary entity storage means 102 using the PID and the CIDa or the SPID correlated with the summary image 2052 as a search key and an entity image corresponding to the summary image 2053 is obtained. This entity image is correlated with the UIDxa and stored in the temporary image storage means 109 (step S2203). In addition, the sending and receiving means of the server X sends the PID and the CIDa or the SPID of the summary image 2054 together with a storage destination of an entity image represented by the summary image 2054 stored in the summary image means in step S1405 to the data terminal A and thereby requests that an entity image represented by the summary image 2054 is obtained. When the sending and receiving means 181 of the imaging terminal of the user A receives this request, the search means 186 searches the image storage means 185 using the PID and the CIDa or the SPID, which are received, as a search key and obtains the entity image represented by the summary image 2054. This search becomes possible because the entity image represented by the summary image 2054 in step S1404 is correlated with the PID and the CIDa or the SPID and stored. The sending and receiving means 181 sends this entity image to the server X100 via the network 199. The sending and receiving means 101 of the server X receives this entity image. This entity image is correlated with the UIDxa and stored in the temporary image storage means 109 (step S2204).

Furthermore, the sending and receiving means 101 of the server X redirects a connection with the data terminal A to the server Z. The sending and receiving means 141 of the server Z sends an HTML code generated by the HTML generation means 142 for generating an authentication screen of the storage service Z to the data terminal A via network 199. When the sending and receiving means 181 receives the HTML code, the HTML analysis means 182 analyzes the code and the display means displays the authentication screen of the storage service Z shown as an example in FIG. 19. Next, the user A inputs the user ID 1921 and the password 1922 using input means 184 which are authentication data and selects the authentication button 1904. Next, the sending and receiving means 181 sends this authentication data to the server Z 140 via the network 199. When the sending and receiving means 141 of the server Z140 receives this data, the authentication means 143 authenticates the user A. Following this process, a connection between the data terminal A and the server Z is again redirected to the server X.

Sending and receiving means 141 of server Z sends data which expresses the fact that user A is authenticated to server X via network 199. When the sending and receiving means 101 of server X receives this data, a request for obtaining an entity image represented by the summary image 2051 is sent to the server Z140 via network 199 together with the PID and the CIDa or the SPID of this entity image (step S2205). When the sending and receiving means 141 of server Z receives this, the search means 145 performs a search using the PID and the CIDa or the SPID of the requested entity image as a search key. This search becomes possible because the entity image represented by the summary image 2051 in step S1610 is correlated with the PID and the CIDa or the SPID and the PID and the CIDa or the SPID are stored. The entity image represented by the summary image 2052 obtained as a result of this search is sent to the server X 100 via the network 199 by the sending and receiving means 141. The sending and receiving means 101 receives the image. The entity image is correlated with UIDxa and stored in the temporary image storage means 109 (step S2206). Furthermore, the order of the three processes of processes in step S220, a process in S2204, and processes steps from S2205 to 2206 may be interchanged.

The entity image represented by the summary images 2052, 2054, and 2051 selected by user A in step S2201 are correlated with UIDxa and stored by server X in the temporary image storage means 109 using the processes in steps S2203 to S2206 described above. Next, the sending and receiving means 101 of the server X redirects a connection between the data terminal A180 and the server X 100 to the server U 150. The HTML generation means 152 of server U generates an HTML code for generating an authentication screen of print service U and the sending and receiving means 151 sends this code to the data terminal A via network 199. When the sending and receiving means 180 of the data terminal A receives this code, an authentication screen is displayed on the display means 183 after analysis by the HTML analysis means 182.

Figure 23:
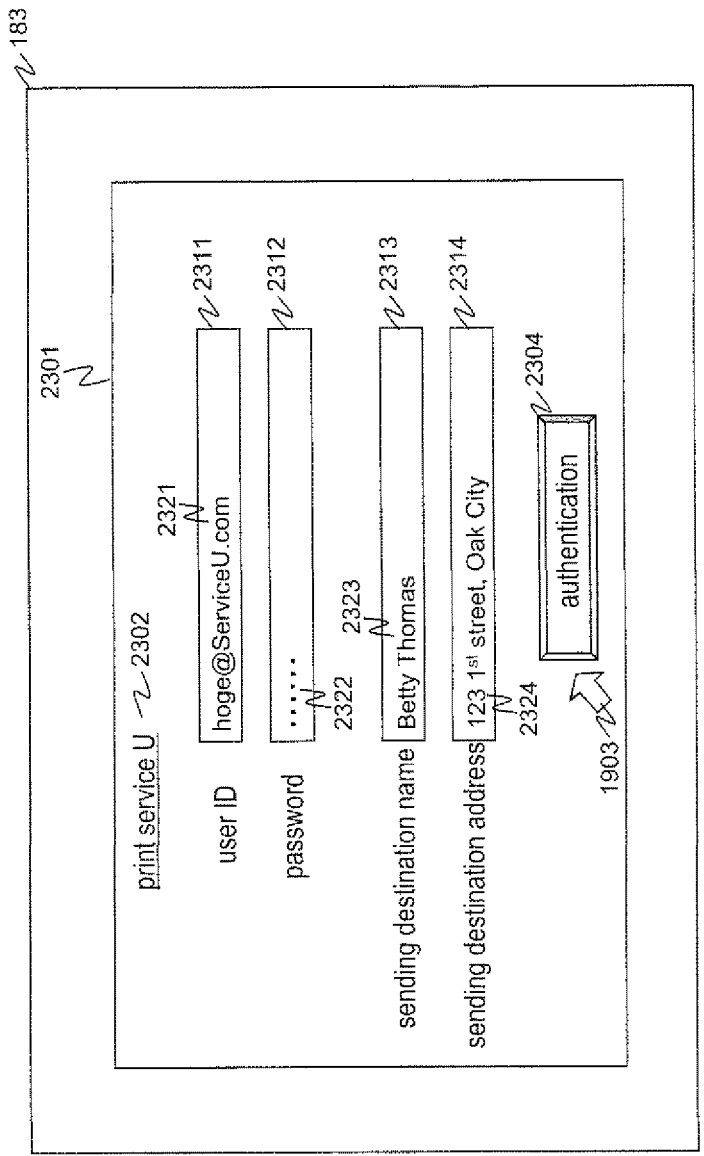

An example of the authentication screen of the print service U is shown in FIG. 23. The authentication screen of the print service U includes a display 2302 which shows that window 2301 is a screen of the print service U, a user ID input section 2311, a password input section 2312, a sending destination name input section 2313, a sending destination address input section 2314, and an authentication button 2304. In the example in FIG. 23, the cursor 1903 is moved to the user ID input section 2311 by the input means 184 and the user ID [hoge@ServiceU.com] 2321 of the user A in the print service U is input and the password 2322 is input to the password input section 2312. Here, the user ID in the print service U is expressed as UIDu. In addition, UIDu of user A is express as UIDua. In the example shown in FIG. 23, the password 1922 is displayed by turned letters. Furthermore, in the example shown in FIG. 23, a name 2323 is input to the sending destination name input section 2313 and an address 2324 is input to the sending destination address input section 2314. Next, when the cursor 1903 is moved by the input means 184 and authentication button 2304 is selected, the input means sends the user ID UIDua 2321 and the password 2322 to the server U150 via network 199. When the sending and receiving mean 151 of the server U receive the ID and the password, the authentication means 153 performs an authentication (step S2207). Furthermore, the sending destination name and sending destination address may be input by the user A using the input means 184 in the authentication screen of the print service U as is shown here. Alternatively, the data stored in advance in the user data storage means 156 of the print server U may be displayed in FIG. 23. Alternatively, data stored in advance in the user data table 105 of the server X may be sent to the server U via network 199 and this data may be used in the server U. In this case, the user table 105 of the server X must include a column for storing a user data such as a name and an address in addition to the columns shown in FIG. 12. In addition, the authentication of the user A by the server U may be omitted and replaced by the authentication process in step S2207 after the authentication of the user A by the server X in step S1005. In this case, step S2207 is omitted.

Next, the server U sends data which expresses the fact that the user A is authenticated is sent to the server X via network 199. When the server X receives this data, the sending and receiving means 101 sends an entity image group stored in the temporary image storage means 109 in step S2203, S2204 and 2206 to the server U via network 199 (step S2008). When the sending and receiving means 151 of server U receives the entity image group, the user ID (UIDua) of the user A in the print service U is correlated with the entity image group and stored in the image data storage means 154. Next, the sending and receiving means 151 sends the entity image group to a printing device 157 via network 119 (step S2009), and the printing device 157 prints the images (step S2010). The entity image group stored in the image data storage means 154 is deleted from the image data storage means 154 when a process in step S2009 is complete and the delivery of the printed entity images is complete and no longer required by the service U. Furthermore, the image gateway service X may be adapted to a plurality of print services, for example, the same processes are performed in the case where the entity images of the summary images selected in FIG. 20 are sent to the server of a print service T shown in FIG. 1.

(Second Embodiment: Display of an Image by Display Terminal A)

Figure 24:
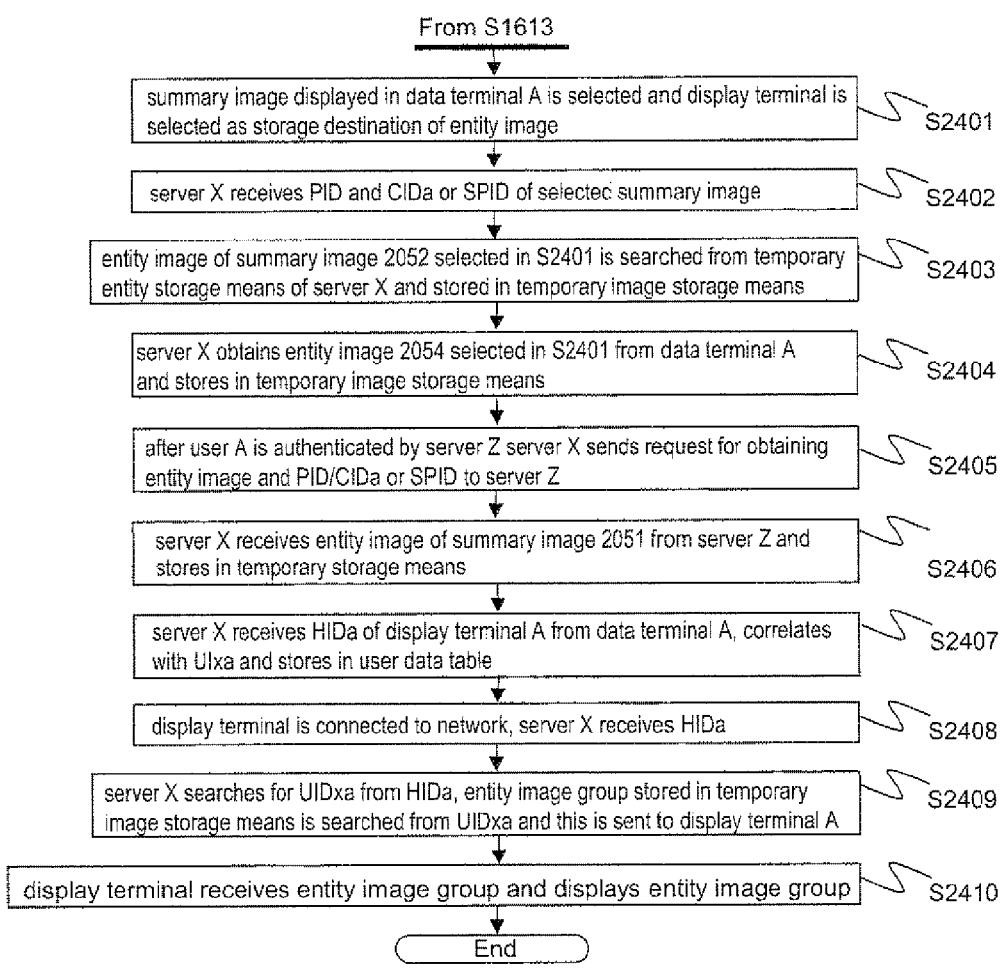
FIG. 24 is a flowchart of a process related to one embodiment of the present invention.

Next, a process for displaying a plurality of entity images stored on a terminal or server on a display terminal A via the image gateway service X is explained using the flowchart shown in FIG. 24. The display terminal A190 may be an image display terminal such as a digital photo-frame or a data device arranged with a display means such as a personal computer, a mobile phone, a camera, a television, or a music player. In addition, the display terminal A190 may also be a data terminal for outputting to other media such as printed paper. The processes in the second embodiment also start after performing step S1613 the same as the first embodiment.

Again referring to FIG. 20, the cursor 1303 displayed in the display means 183 is moved using the input means 184 of the data terminal A and an arbitrary summary image is selected. In the example in FIG. 20, the summary images 2051, 2052, and 2054 are selected. In FIG. 20, the summary images enclosed by double lines express the fact that these are summary images selected at this time. In the example in FIG. 20, a [T] mark 2053 is attached to the summary image 2052 and an entity image represented by the summary image is stored in the temporary entity storage means 102 of the server X. Similarly, an [L] mark 2055 is attached to the summary image 2054 and an entity image represented by this summary image is stored in the image storage means 185 of the data terminal A. Furthermore, an [S] mark 2011 is attached to the summary image 2051 and an entity image represented by this summary image is stored in the image data storage means 143 of the data server Z. Next, the cursor 1303 displayed in the display means 183 is moved by the input means 184 of the data terminal A and the button 1322 of the display terminal is selected as a sending destination (step S2401).

Next, entity images of summary images selected in step S2401 are stored in the temporary image storage means 109 of the server X using the series of processes in step S2402 to S2406 in the flowchart in FIG. 24. This series of processes is exactly the same as the processes from step S2202 to 2206 in the first embodiment except for the following point. In step S2202 in the first embodiment, the data terminal A sends data expressing the fact that a print service selection button 1331 is selected in addition to summary images selected in step S2201 and a PID and a CIDa or an SPID correlated with the summary images to the server X. In step S2402 in the second embodiment, the data terminal A sends data expressing the fact that a display terminal selection button 1332 is selected in addition to the summary images selected in step S2401 and a PID and a CIDa or an SPID correlated with the summary images to the server X. Here, instead of the PID and the CIDa or the SPID of the selected summary images, data expressing the fact that the summary images 2051, 2052 and 2054 are selected may be sent. Except this point, the processes from step S2202 to S2206 in the first embodiment and the processes from step S2402 to S2406 in the second embodiment are the same and thus an explanation is omitted here. Furthermore, the order of the three processes of a process in step S2402, a process in S2404 and processes from S2405 to 2406 may be interchanged. Using these processes, the entity images represented by the summary images 2052, 2054, and 2051 are correlated with UIDxa and stored in the temporary image storage means 109.

Figure 25:
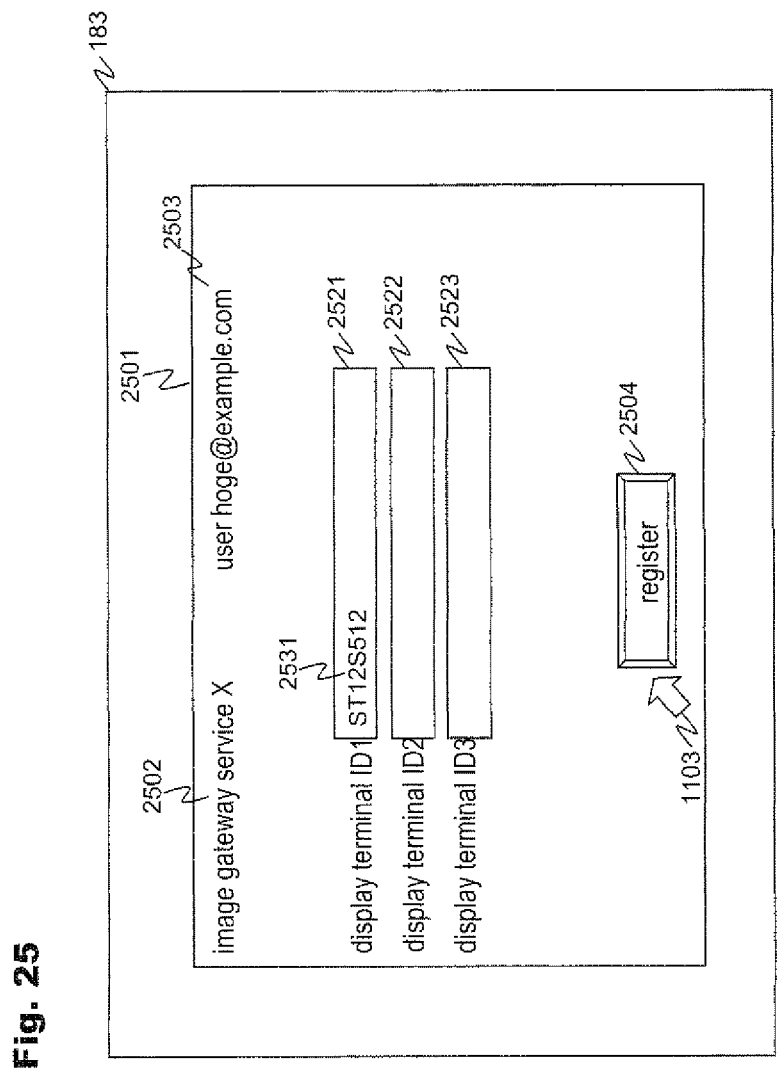
FIG. 25 is an example diagram of a display terminal ID acquisition screen provided by a server X related to one embodiment of the present invention.

Next, the HTML generation means 106 of server X generates an HTML code for generating a screen for obtaining a display terminal ID and the sending and receiving means 101 sends the HTML code to the data terminal A180 via the network 199. The sending and receiving means 180 of the data terminal 180 receives the HTML code and the display means 184 displays the screen for obtaining a display terminal ID after the code is analyzed by the HTML analysis means 182. An example of a screen for obtaining a display terminal ID is shown in FIG. 25. The display means 183 includes a window 2501 of the image gateway service X. Furthermore, the window 2501 includes a display 2502 which expresses the fact that this is a screen of the image gateway service X, data 2503 for specifying the user A, the display terminal ID input sections 2521, 2522, and 2523, and a registration button 2504. The display terminal ID is for uniquely specifying a display terminal connected to the network 199. Here, the display terminal ID is written as HID. In addition, the HID of the display terminal A190 is written as HIDa. In the present invention, it is possible to register a plurality of HIDs with respect to a single user D. That is, in the present example, the user A can use a plurality of display terminals.

Next, the user A inputs an HIDa 2531 by operating the input means 184 and selects the registration button 2504. The sending and receiving means 181 sends HIDa to the server X via the network 199. When the sending and receiving means 101 of the server X receives the HIDa, it is stored in the user data table 105 (step S2407). In the example in FIG. 12, an HIDa 1214 is correlated with the UIDxa 1211 of the user A and stored using this step. An HIDa may be stored in the user data table in advance after being obtained in the screen for obtaining authentication data shown in FIG. 11 during the process in step S1005.

The display terminal A190 is connected to the network 199 at an arbitrary time after the HIDa is correlated with the UIDxa and stored in the user data table 105. Next, the sending and receiving means 191 of the display terminal A sends the HIDa of the display terminal A to the server X100 via the network 199. The HIDa may be sent after being stored in the HID storage means 148 at the time of manufacture of the display terminal A or after being input by the user A using the input means 194. When the sending and receiving means 101 of the server X receives the HIDa from the display terminal A (step S2408), the search means 108 searches the user table 105 using the HIDa as a search key and obtains the UIDxa of the user A. Furthermore, the search means 108 searches the temporary image storage means 109 using the UIDxa as a search key and obtains the entity image group stored in step S2403, 2404 and S2406.

The sending and receiving means 101 sends the entity image group obtained here to the display terminal A 190 via the network 199 (step S2409). When the sending and receiving means 191 of the display terminal A receives the entity image group, the entity image group is stored in the image storage means 159 and the display means 198 displays the entity image group (step S2410).

(Third Embodiment: Display of an Image Using Display Terminal of User B)

Figure 26:
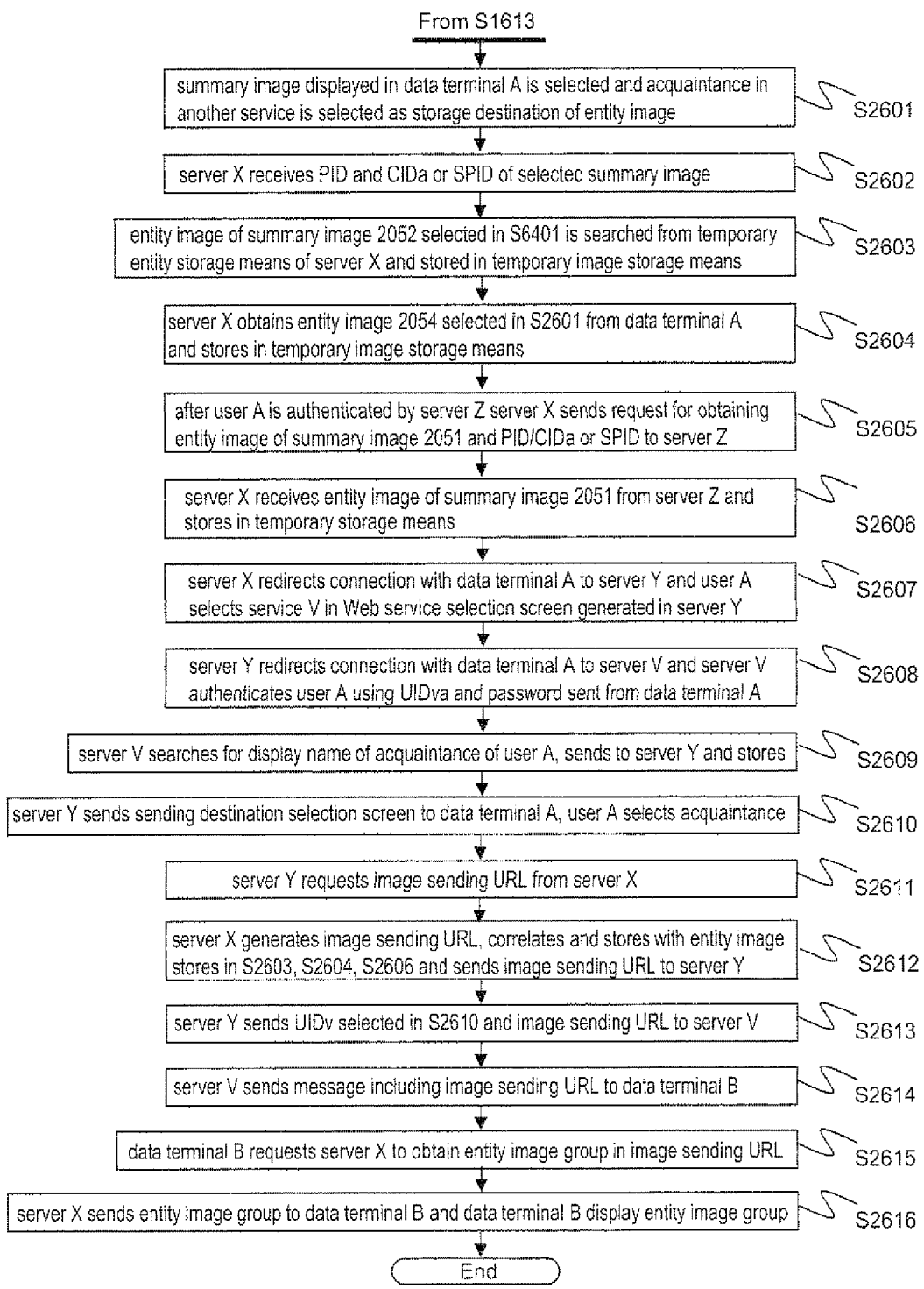
FIG. 26 is a flowchart of a process related to one embodiment of the present invention.

Next, a process for displaying a plurality of entity images, which are stored on a terminal or a server, on a data terminal 195 of user B via the image gateway service X is explained using the flowchart shown in FIG. 26. In the second embodiment, the display terminal A190 is owned by the user A and as a result, the user A can send the HIDa for uniquely specifying the display terminal A190 to the server X via the data terminal A 180 (step S2407). In the third embodiment, the data terminal B 195 is not owned by the user A and since the user A does not know the HID of the data terminal B 195, cannot send the HID of the data terminal B to the server X from the data terminal 180. In addition, in the example in the third embodiment, the user B is an acquaintance of the user A via a Web service V, for example.

The data terminal B 195 may be an image display terminal such as a digital photo-frame or a data device arranged with a display means such as a personal computer, a mobile phone, a camera, a television, or a music player. In addition, the data terminal B195 may also be a data terminal for outputting to other media such as printed paper. The processes in the third embodiment also start after performing the process in step S1613 the same as the first and the second embodiments.

Again referring to FIG. 20, the cursor 1303 displayed in the display means 183 is moved using the input means 184 of the data terminal A and an arbitrary summary image is selected. In the example in FIG. 20, the summary images 2051, 2052, and 2054 are selected. In FIG. 20, summary images enclosed by double lines express the fact that these are summary images selected at this time. In the example in FIG. 20, a [T] mark 2053 is attached to the summary image 2052 and an entity image represented by the summary image is stored in the temporary entity storage means 102 of the server X. Similarly, an [L] mark 2055 is attached to the summary image 2054 and an entity image represented by this summary image is stored in the image storage means 185 of the data terminal A. Furthermore, an [S] mark 2011 is attached to the summary image 2051 and an entity image represented by this summary image is stored in the image data storage means 144 of the data server Z. Next, the cursor 1303 displayed in the display means 183 is moved by the input means 184 of the data terminal A and the acquaintance button 1333 of another service is selected as a sending destination (step S2601).

Next, entity images of summary images selected in step S6401 are stored in the temporary image storage means 109 of the server X using the series of processes in step S2602 to S6406 in the flowchart in FIG. 26. This series of processes is exactly the same as the processes from step S2402 to 2406 in the second embodiment except for the following point. In step S2402 in the second embodiment, the data terminal A sends data expressing the fact that the display terminal 1332 is selected in addition to the summary images selected in step S2401 and a PID and a CIDa or an SPID correlated with each summary images to the server X. In step S2602 in the third embodiment, the data terminal A sends data expressing the fact that an acquaintance of another service button 1333 is selected in addition to the summary images selected in step S2601 and a PID and a CIDa or an SPID correlated with each summary images to the server X. Here, instead of a PID and a CIDa or the SPID of each selected summary images, data expressing the fact that the summary images 2051, 2052, and 2054 are selected may be sent. Except this point, the processes from steps S2402 to S2406 in the second embodiment and the processes from steps S2602 to S2606 in the third embodiment are the same and thus an explanation is omitted here. Furthermore, the order of the three processes of a process in step S6403, a process in S2604, and processes from S2605 to 2606 may be interchanged. Using these processes, the entity images represented by the summary images 2052, 2054, and 2051 are correlated with UIDxa and stored in the temporary image storage means 109.

Next, the sending and receiving means 101 of the server X redirects connection between the data terminal A and the server X100 to the server Y120 using the data expressing the fact the acquaintance of another service selection button 1333 received in step S2602 is selected. Next, the HTML generation means 134 generates an HTML code for generating a Web service selection screen using data of a Web service stored in a Web service table 125 of the server Y. An example of a Web service table 125 is shown in FIG. 27. The Web service table 125 includes a Web service name column 2701, an authentication URL column 2702, a URL for obtaining an acquaintance list column 2703 and a URL for sending a message column 2704. In the example in the third embodiment, the bridge service Y provides a bridge to two Web services, a Web service V 160 and a Web service S 139. Furthermore, here, the Web service V 160 and the Web service Ss139 may be any services as long as they store an acquaintance list of the user A. For example, as long as the storage services used in the present invention provide a storage function for storing an ID list of acquaintances of a user in each server, any service can be used such as a service which mainly provides storage and a browsing function of images (FLICKR etc.), or a service (FACEBOOK etc.) which mainly provides an exchange of diaries such as an SNS (Social Networking Service) or a service which mainly provides an electronic mail (GMAIL etc.), a messenger service (SKYPE etc.), which provides chat or voice telephony, or a goods sales service (AMAZON etc.).

Next, the sending and receiving means 121 sends an HTML code for generating the Web service selection screen to the data terminal A via the network. When the sending and receiving means 181 of the data terminal A receives the HTML code, the Web service selection screen is displayed by the display means 183 after the HTML code is analyzed by the HTML analysis means 182.

Figure 28:
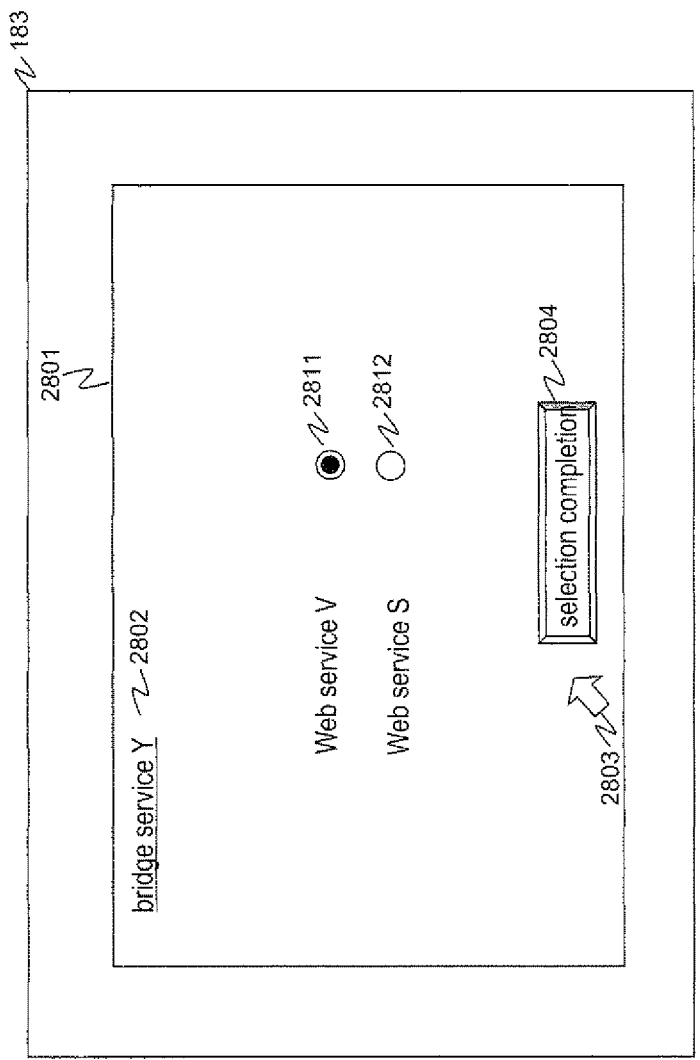
FIG. 28 is an exemplary diagram of a Web service selection screen displayed on a data terminal related to one embodiment of the present invention.

An example of the Web service selection screen is shown in FIG. 28. The window 2801 of the Web service selection screen includes a display 2802 that shows that this is the a service of the bridge service Y, a Web service V selection button 2811, a Web service S selection button 2812, and a selection completed button 2804. The Web service selection screen may or may not include the bridge service display 2802. In addition, the buttons 2811 and 2812 do not have to be buttons as long as each Web service can be selected. In this example, when the Web service election screen is displayed, the HTML generation means of server Y generates an HTML code and sends the code to the data terminal A after the connection to the data terminal A is redirected from the server X 100 to the server Y 120. Other than this, a code such as a script (javascript etc.) for receiving data from the server Y is attached in advance to the HTML code sent to the data terminal A from the server X, and the Web service selection screen output by the server Y may be directly displayed on the screen of the image gateway service X. Furthermore, the server X may include a function equivalent to a Web service table and the server X may send the Web service selection screen to the data terminal A.

Next, the cursor 2803 displayed on the display means 183 is moved using the input means 184 of the data terminal A and the Web service selection button is selected. In the example of FIG. 28 the button 2811 is selected. Following this, the cursor 2803 is moved using the input means 184 and the selection completion button 2804 is selected. The sending and receiving means 181 sends data which expresses the fact that the button 2811 is selected to the server Y120 via the network 199 (step S2607). When the sending and receiving means 121 of the server Y receives this data, the search means 131 searches the Web service table 125 using the Web service name V as a search key and the authentication URL 1212 correlated and stored with the Web service Z is obtained. The sending and receiving means 121 redirects a connection between the terminal A and the server Y to the server V 160 according to the authentication URL 2712.

Figure 29:
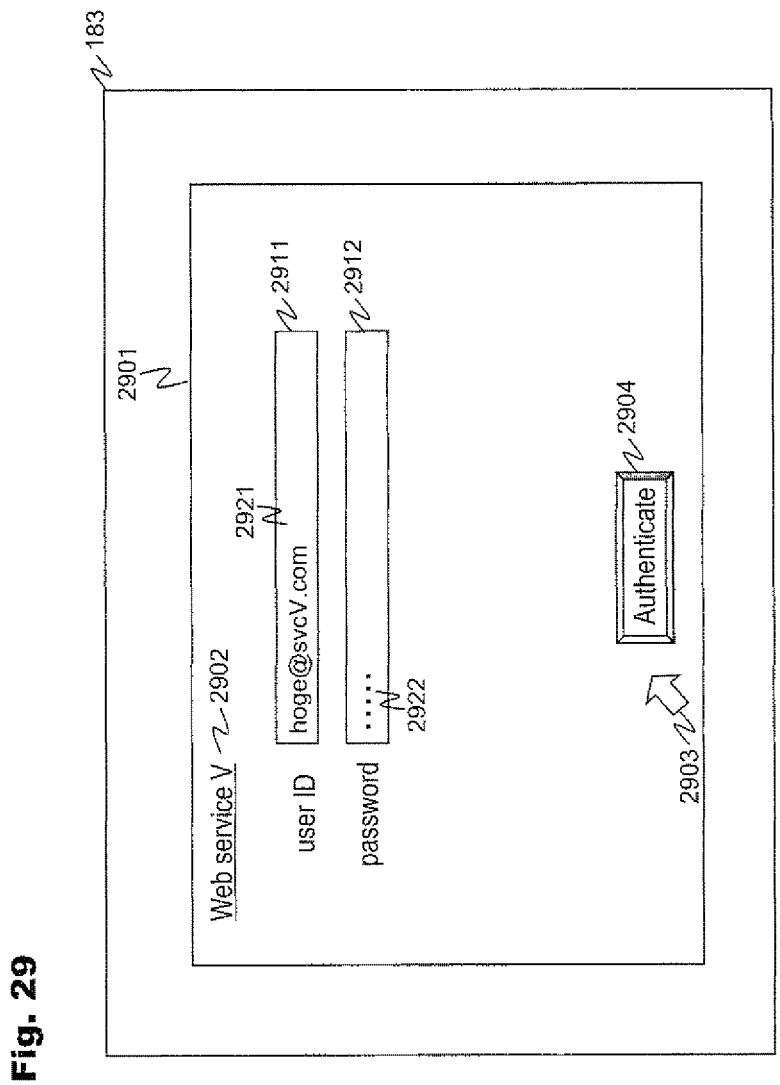
FIG. 29 is an exemplary diagram of an authentication screen displayed on a data terminal related to one embodiment of the present invention.

When the sending and receiving means 161 establishes a connection with the data terminal A, the HTML generation means 162 generates an HTML code for generating an authentication screen of the Web service V and the sending and receiving means 161 sends the code to the data terminal A via the network 199. When the sending and receiving means 181 of the data terminal A receives the code, an authentication screen of the Web service V is displayed on the display means 183 after the code is analyzed by the HTML analysis means 182. An example of the Web service V authentication screen is shown in FIG. 29. The Web service V authentication screen includes an authentication screen window 2901. The authentication screen window 2901 includes a display 2902 which expresses the fact that this is a screen of the Web service V, a user ID input section 2911, a password input section 2912 and an authentication button 2904. In the example in FIG. 29, after the cursor 2903 is moved to the user ID input section 2911 using the input means 184, the user ID [hoge@svcV.com] of the user A in the Web service V is input and the password 2922 is input after moving the cursor 2903 to the password input section 2912. Here, the ID for uniquely specifying a user of the Web service V is expressed as UIDv.

In addition, the ULD of the user A in the Web service V is expressed as the UIDva. In the example in FIG. 29, the password 2922 is displayed as turned characters. Next, when the cursor 2903 is moved by the input means 184 and the authentication button 2904 is selected, the sending and receiving means 181 sends the user ID 2921 and the password 2822 to the server V via the network 199. When the user ID and the password are received by the sending and receiving means of the server V, the authentication means 168 performs an authentication (step S2608). In the example shown here, the user A is a user of the image gateway service X as well as a user of the Web service V, and UIDv and the password are stored in the user table 164 of the server V in advance. In step S2608, the user A may send the UIDva and a password to the server V via the data terminal A180 and perform a user registration in user table 164.

Next, the search means 164 of the server V searches the user table 164 using UIDva as a search key. An example of the user table is shown in FIG. 30. In this example, the user table 164 includes a user ID column 3001, a user display name column 3003, and an acquaintance ID column 3004. In column 3004, UIDv's of a plurality of acquaintances may be correlated with a single UIDv and stored. In the example in FIG. 30, two UIDs [foo@svcV.com] 3014 and [bar@svcV.com] 3015 are correlated with a UIDva 3011 and stored. The search means 163 searches for the UIDva and obtains the UIDv's of acquaintances and using the UIDv's of these acquaintances obtains the display names [Betty] 3023 and [Fred] 3033. Next, the sending and receiving means 161 of the server V sends the acquaintance UID and each display name obtained in this search to the server Y via the network 199. The server Y stores the acquaintance ID and each display name in the sending destination temporary storage means 126 (step S2609). Other than these, a UIDv of each acquaintance and additional information of each acquaintance may also be sent to the server Y.

Figure 31:
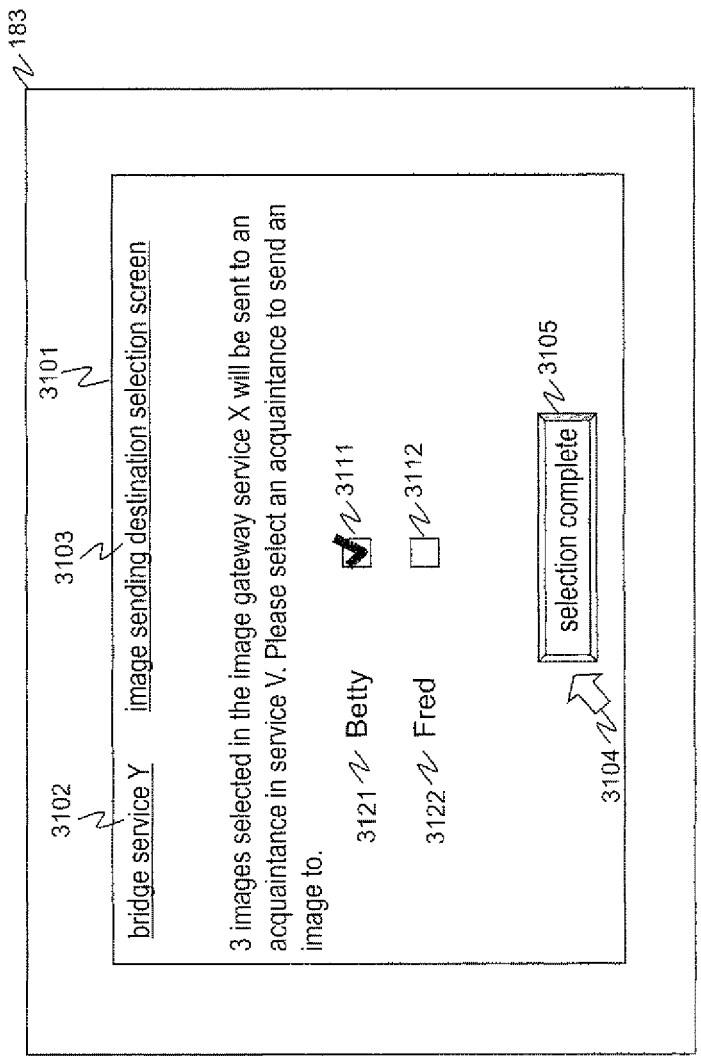
FIG. 31 is an exemplary diagram of an image sending destination selection screen displayed on a data terminal related to one embodiment of the present invention.

When the sending and receiving means 121 of the server Y receives the data, the HTML generation means 134 generates an HTML code for generating an image sending destination authentication screen. The sending and receiving means 121 of the server Y sends the HTML code to the data terminal A via the network 199. When the sending and receiving means 181 of the data terminal A receives the code, an image sending destination authentication screen is displayed on the display means 183 after the code is analyzed by the HTML analysis means 182. An example of the image sending destination authentication screen is shown in FIG. 31. The image sending destination authentication screen window 3101 includes a display 1302 which expresses the fact that this is an a screen of the bridge service Y, a display 3103 which expresses that cat that this is an image sending destination authentication screen, acquaintance display names 3121 and 3122 of the user A in the Web service V, selection checkboxes 3111 and 31112 of each acquaintance, and a selection completed button 3105. In the image sending destination selection screen 3101, the display 1302 may indicate that this is a screen of the bridge service Y, a screen of the Web service V or a screen of the image gateway service X. Here, while the image sending destination selection screen is generated by the server Y 120 and sent to the data terminal A 180, the screen may also be generated by the server Y 160 and sent to the data terminal A 180. In addition, while display names of acquaintances are sent to the server Y in step S2609, the display names may also be sent to the data terminal A180 after being sent to the server X and the server X100 creates the image sending destination selection screen.

Next, the user A moves the cursor 3104 displayed on the display means tip 183 using the input means 184 of the data terminal A, selects the selection checkbox 3111 of the user B [Betty], who is an acquaintance of user A, and then selected the selection completed button 3105 (step S2610). Here, [Betty] is the display name of user B and [foo@svcV.com] is the UIDvb of that ID. Next, when the sending and receiving means 121 of the server Y receives this notification, data which expresses the fact that the selection is completed is correlated with the ID of the acquaintance selected by the user A in step S2610 among acquaintances in the acquaintance list of the user A stored in the sending destination temporary storage area 12 in step S2609 and stored. Alternatively, the ID of an acquaintances other than the acquaintance selected in step S2610 may be deleted from the sending destination temporary storage area 126. Next, the sending and receiving means 121 of the server Y sends a request for an image sending URL of entity images correlate with UIDxa and stored in step S2603, S2604, and S2606 to the server X via the network 199 (step S2611). When the sending and receiving means 101 of the server X receives this request, the image sending URL generation means 111 generates an image sending URL of the entity image group. Next, the image sending URL generated for the entity image group correlated with UIDxa and stored in the temporary image storage means in step S2603, S2604, and S2606 is correlated and stored. In addition, the image sending URL generated by the sending and receiving means 101 is sent to the server Y120 via the network 199 (step S2612).

The sending and receiving means 121 of the server Y receives the image sending URL from the server X. Next, the sending and receiving means 121 sends UIDva which is the ID of an acquaintance selected by the user A in step S2610 and stored in the sending destination temporary storage area in step S2609 and the image sending URL received from the server X to the server V 160 via network 199 with respect to a message sending URL 2711 shown in FIG. 27 (step S2613).

The sending and receiving means 161 of the server V receives these and sends the image sending URL received from the server Y to the data terminal 8195 via the network 199 using UIVb of [Betty] of user B received from the server Y as a receiving address (step S2614). Therefore, the image sending URL to [Betty] selected by the user A as a sending destination is includes in a message to [foo@svcV.com]. The UIDv may be the ID of a message sending means such as a general electronic mail or any other ID of a message sending means. Data other than the image sending URL may also be includes in an electronic mail to the data terminal B.

Figure 32:
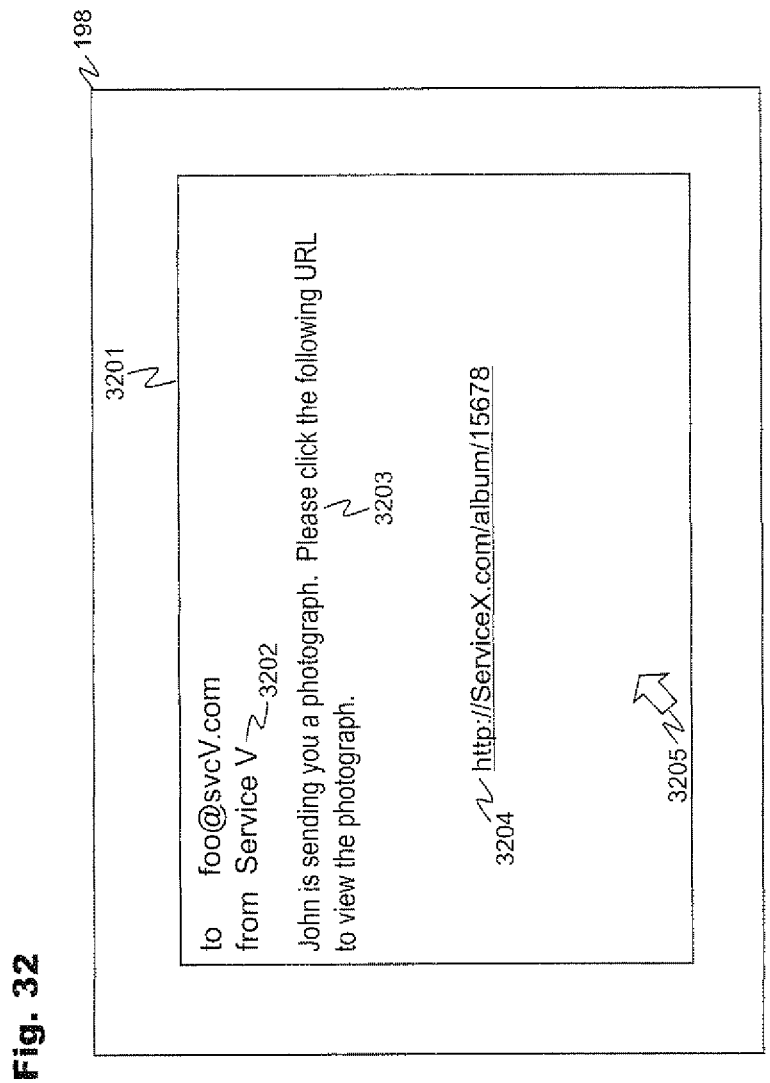
FIG. 32 is an exemplary of a message displayed on a data terminal related to one embodiment of the present invention.

When the sending and receiving means 196 of the data terminal B receives the electronic mail message which includes the image sending URL from the server V, the message is analyzed by the message analysis means 197 and displayed on the display means 198. An example of a message displayed on the data terminal B is shown in FIG. 32. The display means 198 includes a window 3201 for displaying a message. The window 3201 includes a display 3202 which shows that Web service V is the provider of the message, a display 3203 which shows that user A is the image sending source and an image sending URL display 3204. The user B moves the cursor 3205 displayed in the display means 198 using the input means 158 and selects the image URL display 3204.

Next, the sending and receiving means 196 sends a request for obtaining an image sent to the user B by the user A to the server X indicated by the image sending URL via the network 199 (step S2615). When the sending and receiving means 101 of the server X receives this request, the temporary image storage means is searched using the received image sending URL as a search key and an entity image group correlated with the UIDxa in step S2612 and stored in the temporary image storage means is obtained. Next, the sending and receiving means 101 sends the entity image group to the data terminal B195 via the network 199. When the sending and receiving means 196 of the data terminal B receives the entity image group, the entity image group is stored in the image storage means 159 and displayed in the display means 158 (step S2616). A message sent to the data terminal B195 from the server V160 may be sent by an HTML code as well as by electronic mail. In addition, acceptance of image browsing by user B using the data terminal B may be performed by selecting a button rather than a URL. In addition, the image gateway service X may be adapted to a plurality of Web services. For example, in the case where the user A sends a summary image selected in step S2601 to an acquaintance in the Web service S via the server of the Web service S shown in FIG. 1, the same processes explained in FIG. 26 are performed.

In the present invention, a summary image of an entity image taken by the user A is stored in a summary image storage means 103 of the server X. However, the entity images of an image taken by the user A are stored in the temporary entity image storage means 102 of the server X and in the image storage means 185 of the data terminal A and the image data storage means 144 of the server Z. For example, in the case where the user attempts to delete the entity images from the image storage means 185 of the data terminal A, summary images are stored in server X. However, entity images corresponding to these summary images may not exist. Again referring to FIG. 20, when this situation occurs the mark [X] 2060 shows that entity images corresponding to summary image 2061 stored by the server X have been deleted from the data terminal A and do not exist anywhere. Any method for displaying this fact may be used apart from an [X] mark.

Next, the operational effects related to the present invention are explained in detail using the first embodiment, the second embodiment, and the third embodiment described above. The following nine effects are obtained using a server, a data terminal, an imaging terminal, a display terminal, a method, and a system of the present invention.

The first effect is that it is possible to reduce a cumbersome procedure of copying to a data terminal which performs management and maintenance of image data from a data terminal. In step S1003, when the imaging terminal A is connected to the network, all the entity images are sent to the server X and stored in the temporary entity storage means. At this time, it is not necessary for the user A to perform a process for management. According to a conventional method, it is necessary to select which image data is to be uploaded to a server via a network or at least perform this setting in advance. According to the present invention, because entity images are only uploaded to the server X once, the cumbersome procedure of copying to a data terminal is greatly reduced.

Furthermore, as stated previously, the imaging terminal A may upload entity images to the serve X via the data terminal A in the present invention. In addition, entity images stored in a storage media of the imaging terminal A may be uploaded to the server X via the data terminal A without providing the imaging terminal A with a sending and receiving means, but by connecting the storage media to the data terminal A. In this case also, the user A does not need to set which entity images are to be copied to the data terminal A or the server X since all the entity images may be automatically uploaded to the server X. As a result, the first effect is effective also in this case.

The second effect is that it is possible for the user A to maintain image data groups taken with a plurality of imaging terminals as one batch. According to the present invention, as is shown in FIG. 11, it is possible to correlate a plurality of CIDs with UIDxa of the user A in the image gateway service X. All the entity images imaged by a plurality of imaging terminals are stored in the temporary entity storage means 102 of the server X. In the case where the user A uses a plurality of imaging terminals, the temporary entity storage means is searched using all the CIDs and the PIDs or the SPID correlated with the UIDxa. In this way, in a browsing display screen of the image gateway service X shown in FIG. 15, it is possible to manage image data taken with all imaging terminals in an integrated manner and greatly reduce the work required for managing image data compared to a conventional method.

The third effect is that it is possible for a user to batch manage entity images stored across a plurality of storage destinations. According to the present invention, the plurality of storage destinations of the entity images may be a server or an imaging terminal. In addition, the plurality of storage destinations of the entity images may also be servers on different networks. For example, all entity image groups taken by the user A using the imaging terminal A are stored in the temporary entity storage means of the server X in step S1404. However, following this, one part of the entity images is moved to the storage means of the data terminal A in step S1404 and another part is moved to the storage means of server Z in step S1609. Therefore, in step S1613, at the point where the screen in FIG. 2 is displayed in the data terminal A, the entity images taken using the imaging terminal A are separated and stored in the server X, the data terminal A and the server Z. However, as is clear from the explanations in the first embodiment, the second embodiment, and the third embodiment, the user A can execute printing images, backing up images, or sending images to an acquaintance without being aware of the location of the entity images. Even when there is a plurality of storage destinations, the effort required for management of images by a user does not increase, which is an important effect of the present invention.

The fourth effect is that it is easy to backup a large amount of image data. In the present image, all entity images taken by all the imaging terminal of a user can be easily copied or moved to an arbitrary data terminal or a server via the image gateway service X. Therefore, it is possible to easily backup image data by copying entity images to a plurality of data terminals or servers. For example, in FIG. 20, an [L] mark 1511 and an [S] mark are attached to the summary image 1515. This represents the fact that the entity images represented by the summary image 1515 are stored in both image storage means 185 of the data terminal A and the image data storage means 141 of the server Z. This means that even if the entity images stored in either storage location are lost it is possible to use the entity images via the screen of the image gateway service X.

The fifth effect is that it is possible to reduce a cost for managing and storing a large amount of entity data taken with a plurality of imaging terminals in a Web server. With regards to cost it is necessary to examine the three following points: the cost to the operator of the image gateway service X, the cost to the operator of the storage service Z, and the cost to the user A.

First, the cost to the operator of the image gateway service X is examined. It was necessary for a Web service or storage service which stores entity images in a server to store in advance all entity images in a storage means in a server of that service. As a result, if a limit is not set to the volume of entity images entrusted by a user or a charge is set for storing a large amount of image data above an maximum amount, the cost to the service provider increases making it impossible to maintain operation of the service. However, according to the present invention, while all entity images are temporarily stored in the temporary entity storage means 102 in the server X, only summary images are stored in the summary image storage means 103 after moving the entity images to a data terminal or other storage service. Usually, because the amount of a summary image is significantly small compared to its entity image, the amount of data per person that is stored in the server X can be reduced compared to a conventional method. As a result, the image gateway service X can reduce costs regardless of the interface provided to a user for uniformly managing all image data.

Next, the cost to an operator of the storage service Z is examined. Most of the storage services on the internet provide a user with a screen for browsing image data or exchanging with image data with acquaintances and realize profits by displaying advertisements on this screen. According to a conventional method, the cost of providing the storage capacity required by a single user often exceeds the profit from these advertisements. As a result, the use of a storage service is limited to the display of photographs or acquaintance introduction on the internet and opportunities for profit are lost while the number of visiting users decreases. According to the present invention, the operator of the storage service Z can accept entity images within a range matching advertising profits and thereby improve the visiting frequency of users to the storage service Z and increase profits.

Finally, the cost to a user is examined. Until recently, it was cumbersome for a user to store entity images in a plurality of storage destinations and it was often the case that entity images would be stored together in one data terminal or one storage service. However, according to the present invention, such cumbersome operations are not required and it is possible to store entity images in an arbitrary storage destination. As a result, it is possible to store many entity images in an available storage means among a plurality of data terminals. Alternatively, it is possible to use a plurality of Web storage service on the internet and easily separate and store entity images so that each storage service can be used freely. Therefore, the cost of storing a large amount of entity images to a user can be significantly reduced compared to a conventional method.

The sixth effect of the present invention is protection of privacy in the case where image data is kept on the internet. According to a conventional method, in the case image data taken by a user is stored in a server in each internet services, the image data is correlated with a user ID of that internet service and stored. As a result, it is possible for at least the operator of the internet service to specify all the entity images taken by each user by searching image data stored in the server from the user ID. In the method of the present invention, the image gateway service X stores all the reserved images correlated with the user UIDa and stored by simply temporarily storing entity images in the temporary entity storage means 102. Therefore, the problem of privacy is less significant compared to a conventional method. Furthermore, in step S1004, in the case where an entity image group is correlated not only with a combination of a PID and a CIDa but also an SPID and stored in the temporary entity storage means 102, there is no method for specifying an image taken by the user A using the imaging terminal A even for the operator of the image gateway service X. This is realized because an SPID is represented by the following formula and the calculation F is non-reversible and a correlation of a CIDa and an SPID is not stored in server X.

$SPIDn=F(PIDn,CIDaa)$

The seventh effect is that it is possible to unify various operations such as backup, printing, sending to an acquaintance, display on a data terminal, or display terminal of all images taken on a plurality of imaging terminals by a single user. In the first embodiment, the second embodiment, and the third embodiment, a user can execute backing up images, printing images, or sending images to an acquaintance by selecting a service or terminal on the bridge service Y after selecting an image which the user wishes to use on a screen of the image gateway service X shown in FIG. 20. At this time, it is not necessary for the user A to be aware of which imaging terminal took each image or the storage destination of the entity images. In addition, it is not necessary for a user to be aware if the sending destination of an image is a Web service, a display terminal, or a data terminal.

The eighth effect is that it is possible to easily send or share image data on the image gateway service X by integrally using the acquaintance relationships known by a user of the image gateway service X on other Web services. Most internet users use various Web services and possess acquaintance relationships on each service. For example, a user may have a sending destination list on an electronic mail service, an acquaintance list of exchanging diaries on an SNS service, a telephone number list on a messenger service such as a chat or voice telephony, or a list of acquaintances for exchanging photographs on a photograph sharing service. In the system of the present invention, it is possible to easily send image data by selecting all of the acquaintance selection buttons 1333 of another service shown in FIG. 20 and selecting a Web service for on which a user wishes to a use an acquaintance list on the bridge service Y.

The ninth effect is a high scalability of service expansion. As explained herein, in the present invention it is possible to easily execute backing up image data, displaying image data, printing image data, or sending image data to an acquaintance on another Web service by linking the image gateway service X, the display terminal or the data terminal and various Web services. Actually, there are many services on the internet such as storage services, image browsing services, print services, and Web services including an acquaintance list. It is possible to realize the method of the present invention even if a function provided by the server Y explained above is provide by the server X. However, it is possible to add or delete corresponding storage services, image browsing services, print services, and Web services including an acquaintance list without adding changes to the server X by providing the server Y with a bridge function which links the image gateway service X and various terminals or servers. For example, in step S1604 or step S2607, the server Y provides a storage service selection screen shown in FIG. 19 or a Web service selection screen shown in FIG. 28 to the data terminal A. Even in the case where storage services, print services, or Web services, which is compatible with the image gateway service X, increase, according to the method of the present invention, it is not necessary to make the bridge service Y compatible or to change the server X.

Furthermore, in the present invention there may be a plurality of image gateway services X. For example, a further image gateway service R is connected to the network 199 of the first embodiment of the present invention shown in FIG. 1 which links storage services Z and W, print services U and T, and Web services V and S. In this case also, it is possible to provide a user of the image gateway service R with the first to the eighth effects described above simply by adding a mechanism corresponding to the image gateway service R to the server Y without adding changes to each server of Z, W, U, T, V, and S.

According to the present invention, a server, an imaging terminal, a data terminal, a display terminal, and system are provided in which a user can uniformly organize, manage and maintain image data which are taken by various imaging terminals and which are scattered and stored among various servers and terminals by using a gateway service on the internet. In addition, according to the present invention, because it is possible to separate and store image data among various storage media, it is possible to solve the problem of cost incurred when storing a large amount of image data on a server and to solve the problem of backup without increasing the complexity of organizing, managing, and maintaining image data.

What is claimed is:

1. A method of operating a server providing a network service comprising:
receiving from a first imaging terminal of a first user a first image data group comprised from a plurality of image data and a first imaging terminal ID for uniquely specifying the first imaging terminal;
receiving a first scrambled PID and a second scrambled PID from a server of a bridge service in response to sending a first image ID for uniquely specifying a first image data being one image data in the first image data group, a second image ID for uniquely specifying a second image data being another image data, and the first imaging terminal ID to the server of the bridge service, the first scrambled PID being generated based on the first image ID and the first imaging terminal ID, the second scrambled PID being generated based on the second image ID and the first imaging terminal ID, the server of the bridge server correlating the first scrambled PID with the first imaging terminal ID, the server of the bridge server correlating the second scrambled PID with the first imaging terminal ID;
storing in a first storage means the first scrambled PID and the first image data with the first scrambled PID correlated with the first image data;
storing in the first storage means the second scrambled PID and the second image data with the second scrambled PID correlated with the second image data;
receiving a first user ID for specifying the first user among users of the network service and the first imaging terminal ID from a first data terminal of the first user;
storing in a second storage means the first user ID and the first imaging terminal ID with the first user ID correlated with the first imaging terminal ID;
searching in the second storage means using the first user ID as a search key and extracting the first imaging terminal ID as a search result;
receiving the first scrambled PID and the second scrambled PID from the server of the bridge service in response to sending the extracted first imaging terminal ID to the server of the bridge service, the first scrambled PID being correlated with the extracted first imaging terminal ID, the second scrambled PID being correlated with the extracted first imaging terminal ID;
searching in the first storage means using the received first scrambled PID as a search key and extracting the first image data as a search result;
searching in the first storage means using the received second scrambled PID as a search key and extracting the second image data as a search result;

generating a first summary image, which represents the extracted first image data, having a smaller amount of data than the first image data;
generating a second summary image, which represents the extracted second image data, having a smaller amount of data than the second image data;
storing in a third storage means the first summary image and the first scrambled PID with the first summary image correlated with the first scrambled PID;
storing in the third storage means the second summary image and the second scrambled PID with the second summary image correlated with the second scrambled PID; and sending the first summary image and the second summary image to the first data terminal.

2. A method of operating a server providing a network service comprising:
receiving from a first imaging terminal of a first user a first image data group comprised from a plurality of image data and a first imaging terminal ID for uniquely specifying the first imaging terminal, the first image data group being imaged by the first imaging terminal;
receiving a first scrambled PID and a second scrambled PID from a server of a bridge service in response to sending a first image ID for uniquely specifying a first image data being one image data in the first image data group, a second image ID for uniquely specifying a second image data being another image data, and the first imaging terminal ID to the server of the bridge service, the first scrambled PID being generated by the server of the bridge server based on the first image ID and the first imaging terminal ID, the second scrambled PID being generated by the server of the bridge server based on the second image ID and the first imaging terminal ID, the server of the bridge server correlating the first scrambled PID with the first imaging terminal ID, the server of the bridge server correlating the second scrambled PID with the second imaging terminal ID;
storing in a first storage means the first scrambled PID and the first image data with the first scrambled PID correlated with the first image data;
storing in the first storage means the second scrambled PID and the second image data with the second scrambled PID correlated with the second image data;
receiving a first user ID for specifying the first user among users of the network service and the first imaging terminal ID from a first data terminal;
storing in a second storage means the first user ID and the first imaging terminal ID with the first user ID correlated with the first imaging terminal ID;
searching in the second storage means using the first user ID as a search key and extracting the first imaging terminal ID as a search result;
receiving the first scrambled PID and the second scrambled PID from the server of the bridge service in response to sending the extracted first imaging terminal ID to the server of the bridge service, the first scrambled PID being correlated with the extracted first imaging terminal ID, the second scrambled PID being correlated with the extracted first imaging terminal ID;
searching in the first storage means using the received first scrambled PID as a search key and extracting the first image data as a search result;
searching in the first storage means using the received second scrambled PID as a search key and extracting the second image data as a search result;
generating a first summary image, which represents the extracted first image data, having a smaller amount of data than the first image data;
generating a second summary image, which represents the extracted second image data, having a smaller amount of data than the second image data;
storing in a third storage means the first summary image and the first scrambled PID with the first summary image correlated with the first scrambled PID;
storing in the third storage means the second summary image and the second scrambled PID with the second summary image correlated with the second scrambled PID; and
sending the first summary image and the second summary image to the first data terminal.

3. The method of operating the server according to claim 1 further comprising:
receiving from a second imaging terminal of the first user a second image data group comprised from a plurality of image data and a second imaging terminal ID for uniquely specifying the second imaging terminal;
receiving a third scrambled PID from the server of the bridge service in response to sending a third image ID for uniquely specifying a third image data being one image data in the second image data group, and the second imaging terminal ID to a server of a bridge service, the third scrambled PID being generated based on the third image ID and the second imaging terminal ID, the server of the bridge server correlating the third scrambled PID with the second imaging terminal ID;
storing in the first storage means the third scrambled PID and the third image data, the third scrambled PID being correlated with the third image data;
receiving the first user ID and the second imaging terminal ID from the first data terminal;
storing in the second storage means the first user ID and the second imaging terminal ID, the first user ID being correlated with the second imaging terminal ID;
searching in the second storage means using the first user ID as a search key and extracting the first imaging terminal ID and the second imaging terminal ID as a search result;
receiving the third scrambled PID from the server of the bridge service in response to sending the extracted second imaging terminal ID to the server of the bridge service, the third scrambled PID being correlated with the extracted second imaging terminal ID;
searching in the first storage means using the received third scrambled PID as a search key and extracting the third image data as a search result;
generating a third summary image, which represents the extracted third image data, having a smaller amount of data than the third image data;
storing in the third storage means the third summary image and the third scrambled PID,. the third summary image being correlated with the third scrambled PID; and
sending the first summary image, the second summary image, and the third summary image to the first data terminal.

4. The method of operating the server according to claim 1 further comprising:
receiving from a third imaging terminal of a second user a third image data group comprised from a plurality of image data and a third imaging terminal ID for uniquely specifying the third imaging terminal, the third image data group being imaged by the third imaging terminal;

receiving a fourth scrambled PID from the server of the bridge service in response to sending a fourth image ID for uniquely specifying a fourth image data being one image data in the third image data group, and the third imaging terminal ID to the server of the bridge service, the fourth scrambled PID being generated based on the fourth image ID and the third imaging terminal ID, the server of the bridge service correlating the fourth scrambled PID with the third imaging terminal ID;

storing in the first storage means the fourth scrambled PID and the fourth image data the fourth scrambled PID being correlated with the fourth image data;

receiving a second user ID for uniquely specifying the second user among users of the network service and the third imaging terminal ID from a second data terminal;

storing in the second storage means the second user ID and the third imaging terminal ID, the second user ID being correlated with the third imaging terminal ID;

searching in the second storage means using the second user ID as a search key and extracting the third imaging terminal ID as a search result;

receiving the fourth scrambled PID from the server of the bridge service in response to sending the extracted third imaging terminal ID to the server of the bridge service, the fourth scrambled PID being correlated with the third terminal ID;

searching in the first storage means using the received fourth scrambled PID as a search key and extracting the fourth image data as a search result;

generating a fourth summary image, which represents the extracted fourth image data, having a smaller amount of data than the fourth image data;

storing in the third storage means the fourth summary image and the fourth scrambled PID, the fourth summary image being correlated with the fourth scrambled PID; and sending the fourth summary image to the second data terminal.

5. The method of operating the server according to claim 1 further comprising:

receiving data expressing the fact that the first user selects the first summary image and data expressing the fact that the first data terminal is selected as a storage destination from the first data terminal;

searching for the first scrambled PID as a search key in the first storage means and extracting the first image data;

sending the extracted first image data and the first scrambled PID to the first data terminal; and deleting the first image data from the first storage means.

6. The method of operating the server according to claim 1 further comprising:

receiving data expressing the fact that the first user selects the second summary image and data expressing the fact that a server of a storage service is selected as a storage destination from the first data terminal;

searching in the first storage means for the second scrambled PID as a search key and extracting the second image data;

sending the second image data and the second scrambled PID to the server of the storage service specified by a sending destination; and deleting the second image data from the first storage means.

7. The method of operating the server according to claim 6 further comprising:

receiving data expressing the fact that the first user selects the second summary image and data expressing the fact that a server of a print service is selected as a sending destination from the first data terminal;

receiving data expressing the fact that the server of the storage service authenticates the first user via the first data terminal from the server of the storage service;

receiving the second image data from the server of the storage service in response to sending the second scrambled PID for searching in the server of the storage service to the server of the storage service; and sending the received second image data to the server of the print service.

8. The method of operating the server according to claim 6 further comprising:

receiving data expressing the fact that the first user selects the second summary image and data expressing the fact that a display terminal is selected as a sending destination from the first data terminal;

receiving data expressing the fact that the server of the storage service authenticates the first user via the first data terminal from the server of the storage service;

receiving the second image data from the server of the storage service in response to sending the second scrambled PID for searching in the server of the storage service;

receiving from the first data terminal a sending destination ID for uniquely specifying the display terminal within the network;

storing in the second storage means the second sending destination ID and the first user ID, the sending destination ID being correlated with the first user ID; and sending the second image data received from the server of the storage service to the display terminal.

9. The method of operating the server according to claim 6 further comprising:

receiving data expressing the fact that the first user selects the second summary image and data expressing the fact that an acquaintance of a Web service is selected as a sending destination from the first data terminal;

receiving data from the server of the storage service expressing the fact that the server of the storage service authenticates the first user via the first data terminal;

receiving the second image data from the server of the storage service in response to sending the second scrambled PID to the server of the storage service;

requesting the server of the bridge service to send a Web service selection request screen to the first data terminal;

generating an image sending URL;

storing in a fourth storage means the image sending URL and the second image data received from the server of the storage service, the image sending URL being correlated with the second image data;

sending the image sending URL to a data terminal of the first user and a data terminal of a third user being the acquaintance of the Web service via the server of the bridge service a server of the Web service; and sending to the data terminal of the third user the second image data correlated with the image sending URL and stored in the fourth storage means according to a request from the data terminal of the third user.

10. A system comprising:

a first imaging terminal of a first user, a server of a network service, and a bridge server;

wherein:

the first imaging terminal of the first user sends a first image data group comprised from a plurality of image data and a first imaging terminal ID for uniquely specifying the first imaging terminal to a server of a network service;

the server of the network service sends a first image ID for uniquely specifying a first image data being one image data among the first image data group, a second image ID for uniquely specifying a second image data being another image data, and the first imaging terminal ID to a bridge server;

the bridge server generates a first scrambled PID formed by a non-reversible calculation of the first image ID and the first imaging terminal ID;

the bridge server generates a second scrambled PID formed by a non-reversible calculation of the second image ID and the first imaging terminal ID;

the bridge server stores in a fifth storage means the first imaging terminal ID, the first scrambled PID, and the second scrambled PID, the first imaging terminal ID and the first scrambled PID being correlated with the second scrambled PID;

the bridge server sends the first scrambled PID and the second scrambled PID to the server of the network service;

the server of the network service stores in a first storage means the first scrambled PID and the first image data, the first scrambled PID being correlated with the first image data;

the server of the network service stores in the first storage means the second scrambled PID and the second image data, the second scrambled PID being correlated with the second image data;

a first data terminal of the first user sends a first user ID for specifying the first user among users of the network service and the first imaging terminal ID to the server of the network service;

the server of the network service stores in a second storage means the received first user ID and the first imaging terminal ID, the received first user ID being correlated with the first imaging terminal ID;

the server of the network service searches in the second storage means using the first user ID as a search key and extracting the first imaging terminal ID as a search result;

the server of the network service sends the extracted first imaging terminal to the bridge server;

the bridge server searches in the fifth storage means using the received first imaging terminal ID as a search key;

the bridge server sends the first scrambled PID and the second scrambled PID extracted as a search result to the server of the network service;

the server of the network service receives the first scrambled PID and the second scrambled PID;

the server of the network service searches in the first storage means using the received first scrambled PID as a search key and extracting the first image data as a search result;

the server of the network service searches in the first storage means using the received second scrambled PID as a search key and extracting the second image data as a search result;

the server of the network service generates a first summary image, which represents the extracted first image data, having a smaller amount of data than the first image data;

the server of the network service generates a second summary image, which represents the extracted second image data, having a smaller amount of data than the second image data;

the server of the network service stores in a third storage means the first summary image and the first scrambled PID, the first summary image being correlated with the first scrambled PID;

the server of the network service stores in the third storage means the second summary image and the second scrambled PID, the second summary image being correlated with the second scrambled PID;

the server of the network service sends the first summary image and the second summary image to the first data terminal; and a display means of the first data terminal displays the received first summary image and the second summary image.

11. A system comprising: a first imaging terminal of a first user, a server of a network service, and a bridge server; wherein:

the first imaging terminal of the first user sends a first image data group comprised from a plurality of image data to a first data terminal of the first user;

the first data terminal sends the first image data group and a first imaging terminal ID for uniquely specifying the first imaging terminal to a server of a network service;

the server of the network service sends a first image ID for uniquely specifying a first image data being one image data among the first image data group, a second image ID for uniquely specifying a second image data being another image data, and the first imaging terminal ID to a bridge server;

the bridge server generates a first scrambled PID formed by a non-reversible calculation of the first image ID and the first imaging terminal ID;

the bridge server generates a second scrambled PID formed by a non-reversible calculation of the second image ID and the first imaging terminal ID;

the bridge server stores in a fifth storage means the first imaging terminal ID, the first scrambled PID, and the second scrambled PID, the first imaging terminal ID and the first scrambled PID being correlated with the second scrambled PID;

the bridge server sends the first scrambled PID and the second scrambled PID to the server of the network service;

the server of the network service stores in a first storage means the first scrambled PID and the first image data, the first scrambled PID being correlated with the first image data;

the server of the network service stores in the first storage means the second scrambled PID and the second image data, the second scrambled PID being correlated with the second image data;

the first data terminal of the first user sends a first user ID for specifying the first user among users of the network service and the first imaging terminal ID to the server of the network service;

the server of the network service stores in a second storage means the received first user ID and the first imaging terminal ID, the received first user ID being correlated with the first imaging terminal ID;

the server of the network service searches in the second storage means using the first user ID as a search key and extracting the first imaging terminal ID as a search result;

the server of the network service sends the extracted first imaging terminal to the bridge server;

the bridge server searches in the fifth storage means using the received first imaging terminal ID as a search key;

the bridge server sends the first scrambled PID and the second scrambled PID extracted as search results to the server of the network service;

the server of the network service receives the first scrambled PID and the second scrambled PID from the bridge server;

the server of the network service searches in the first storage means using the received first scrambled PID as a search key and extracting the first image data as a search result;

the server of the network service searches in the first storage means using the received second scrambled PID as a search key and extracting the second image data as a search result;

the server of the network service generates a first summary image, which represents the extracted first image, having a smaller amount of data than the first image data;

the server of the network service generates a second summary image, which represents the extracted second image data, having a smaller amount of data than the second image data;

the server of the network service stores in a third storage means the first summary image and the first scrambled PID, the first summary image being correlated with the first scrambled PID;

the server of the network service stores in the third storage means the second summary image and the second scrambled PID, the second summary image being correlated with the second scrambled PID;

the server of the network service sends the first summary image and the second summary image to the first data terminal; and a display means of the first data terminal displays the received first summary image and the second summary image.

12. The system according to claim 10 further comprising:
a second imaging terminal of the first user sending a second image data group comprised from a plurality of image data and a second imaging terminal ID for uniquely specifying the second imaging terminal to the server of the network service; wherein the server of the network service sends a third image ID for uniquely specifying a third image data being one image data among the second image data group, and the second imaging terminal ID to the bridge server;

the bridge server generates a third scrambled PID formed by a non-reversible calculation of the third image ID and the second imaging terminal ID;

the bridge server stores in the fifth storage means the second imaging terminal ID and the third scrambled PID, the second imaging terminal ID being correlated with the third scrambled PID;

the bridge server sends the third scrambled PID to the server of the network service;

the server of the network service stores in the first storage means the third scrambled PID and the third image data, the third scrambled PID being correlated with the third image data;

the first data terminal sends the first user ID for specifying the first user among users of the network service and the second imaging terminal ID to the server of the network service;

the server of the network service stores in the second storage means the received first user ID and the second imaging terminal ID, the received first user ID being correlated with the second imaging terminal ID;

the server of the network service searches in the second storage means using the first user ID as a search key and extracting the second imaging terminal ID as a search result;

the server of the network service sends the extracted second imaging terminal to the bridge server;

the bridge server searches for the received second imaging terminal ID as a search key in the fifth storage means;

the bridge server sends the third scrambled PID extracted as a search result to the server of the network service;

the server of the network service searches in the first storage means using the received third scrambled PID as a search key and extracting the third image data as a search result;

the server of the network service generates a third summary image, which represents the extracted third image data, having a smaller amount of data than the third image data;

the server of the network service stores in the third storage means the third summary image and the third scrambled PID, the third summary image being correlated with the third scrambled PID;

the server of the network service sends the first summary image, the second summary image, and the third summary image to the first data terminal; and a display means of the first data terminal displays the received first summary image, the second summary image, and the third summary image.

13. The system according to claim 10 further comprising:
a third imaging terminal of a second user sending a third image data group comprised from a plurality of image data and a third imaging terminal ID for uniquely specifying the third imaging terminal to the server of the network service; wherein the server of the network service sends a fourth image ID for uniquely specifying a fourth image data being one image data among the third image data group, and the third imaging terminal ID to the bridge server;

the bridge server generates a fourth scrambled PID formed by a non-reversible calculation of the fourth image ID and the third imaging terminal ID;

the bridge server stores in the fifth storage means the third imaging terminal ID and the fourth scrambled PID, the third imaging terminal ID being correlated with the fourth scrambled PID;

the bridge server sends the fourth scrambled PID to the server of the network service;

the server of the network service stores in the first storage means the fourth scrambled PID and the fourth image data, the fourth scrambled PID being correlated with the fourth image data;

the second data terminal sends a second user ID for specifying the second user among users of the network service and the third imaging terminal ID to the server of the network service;

the server of the network service stores in the second storage means the second user ID and the third imaging terminal ID, the second user ID being correlated with the third imaging terminal ID;

the server of the network service searches in the second storage means using the second user ID as a search key and extracting the third imaging terminal ID as a search result;

the server of the network service sends the extracted third imaging terminal to the bridge server;

the bridge server searches in the fifth storage means using the received third imaging terminal ID as a search key;

the bridge server sends the fourth scrambled PID extracted as a search result to the server of the network service;

the server of the network service searches in the first storage means using the received fourth scrambled PID as a search key and extracting the fourth image data as a search result;

the server of the network service generates a fourth summary image, which represents the extracted fourth image data, having a smaller amount of data than the fourth image data;

the server of the network service stores in the third storage means the fourth summary image and the fourth scrambled PID, the fourth summary image being correlated with the fourth scrambled PID;

the server of the network service sends the fourth summary image to the second data terminal; and a display means of the fourth data terminal displays the received fourth summary image.

14. The system according to claim 10 wherein:

the first data terminal sends data expressing the fact that the first user selects the first summary image and data expressing the fact that the first data terminal is selected as a storage destination to the server of the network service;

the server of the network service searches in the first storage means using the first scrambled PID as a search result and extracting the first image data;

the server of the network service sends the extracted first image data and the first scrambled PID to the first data terminal;

the server of the network service deletes the first image data from the first storage means; and the first data terminal stores the first image data received from the server of the network service and the first scrambled PID.

15. The system according to claim 10 wherein:

the first data terminal sends data expressing the fact that the first user selects the second summary image and data expressing the fact that a server of a storage service is selected as a storage destination to the server of the network service;

the server of the network service searches in the first storage means using the second scrambled PID as a search result and extracting the second image data;

the server of the network service sends a request to the bridge server to send a storage service selection request screen to the first data terminal;

the bridge server sends the storage service selection request screen including the storage service as a selection option to the first data terminal;

the first data terminal sends data expressing the fact the storage service is selected to the bridge server;

the bridge server sends a sending destination ID for uniquely specifying the storage service within a network to the server of the network service;

the server of the network service sends the second image data and the second scrambled PID to the server of the storage service specified by the sending destination ID;

the bridge server deletes the second image data from the first storage means; and the server of the storage means stores the second image data and the second scrambled PID, the second image data being correlated with the second scrambled PID.

* * * * *